US012696177B2

(12) United States Patent
Sirotkin et al.

(10) Patent No.: US 12,696,177 B2
(45) Date of Patent: Jul. 28, 2026

(54) HARMONIZATION OF SPECTRUM ACCESS TIER AND CORE NETWORK ARCHITECTURE

(71) Applicant: Apple Inc., Cupertino, CA (US)

(72) Inventors: Alexander Sirotkin, Hod Hasharon (IL); Haijing Hu, Los Gatos, CA (US); Pavan Nuggehalli, San Carlos, CA (US)

(73) Assignee: APPLE INC., Cupertino, CA (US)

( * ) Notice: Subject to any disclaimer, the term of this patent is extended or adjusted under 35 U.S.C. 154(b) by 556 days.

(21) Appl. No.: 18/127,523

(22) Filed: Mar. 28, 2023

(65) Prior Publication Data

US 2023/0337119 A1      Oct. 19, 2023

Related U.S. Application Data

(60) Provisional application No. 63/331,141, filed on Apr. 14, 2022.

(51) Int. Cl.
*H04W 4/00* (2018.01)
*H04W 48/08* (2009.01)
*H04W 48/16* (2009.01)

(52) U.S. Cl.
CPC ........... *H04W 48/16* (2013.01); *H04W 48/08* (2013.01)

(58) Field of Classification Search
CPC ..... H04W 48/16; H04W 48/08; H04W 48/20; H04W 16/14

USPC ........................................................... 370/329
See application file for complete search history.

(56) References Cited

U.S. PATENT DOCUMENTS

| | | | | |
|---|---|---|---|---|
| 2013/0122949 | A1* | 5/2013 | He | H04B 7/24 |
| | | | | 455/62 |
| 2019/0069201 | A1* | 2/2019 | Hassan | H04W 16/14 |
| 2021/0022009 | A1* | 1/2021 | De Sousa Chaves | |
| | | | | H04W 76/25 |
| 2021/0306853 | A1* | 9/2021 | Gundavelli | H04W 12/06 |
| 2022/0070680 | A1* | 3/2022 | Furuichi | H04W 16/02 |
| 2022/0400487 | A1* | 12/2022 | Sevindik | H04W 72/0453 |

\* cited by examiner

*Primary Examiner* — Temica M Beamer
(74) *Attorney, Agent, or Firm* — Kilpatrick Townsend & Stockton LLP

(57) ABSTRACT

Techniques are disclosed for the harmonization of a spectrum access tier and a core network architecture. One example includes a method implemented for the harmonization of a spectrum access tier and a core network architecture. An access and mobility management function (AMF) of a first network can receive a first request message, including a spectrum inquiry request from a base station to an automated frequency coordinator of the first network. The automated frequency coordinator can use an AMF interface and an automated frequency coordinator interface to determine a spectrum inquiry response. The spectrum inquiry response can describe an available frequency band of a spectrum access tier of a second network for the base station. The AMF can transmit the spectrum inquiry response to the base station.

20 Claims, 17 Drawing Sheets

1300

300

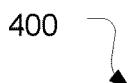
400
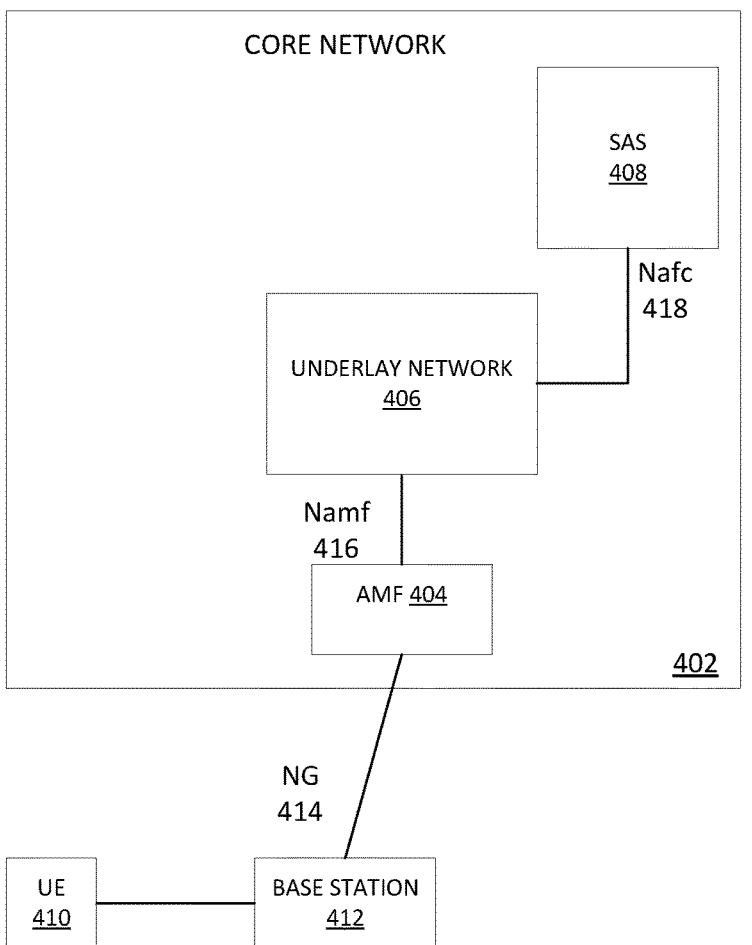
FIG. 4

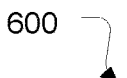
600
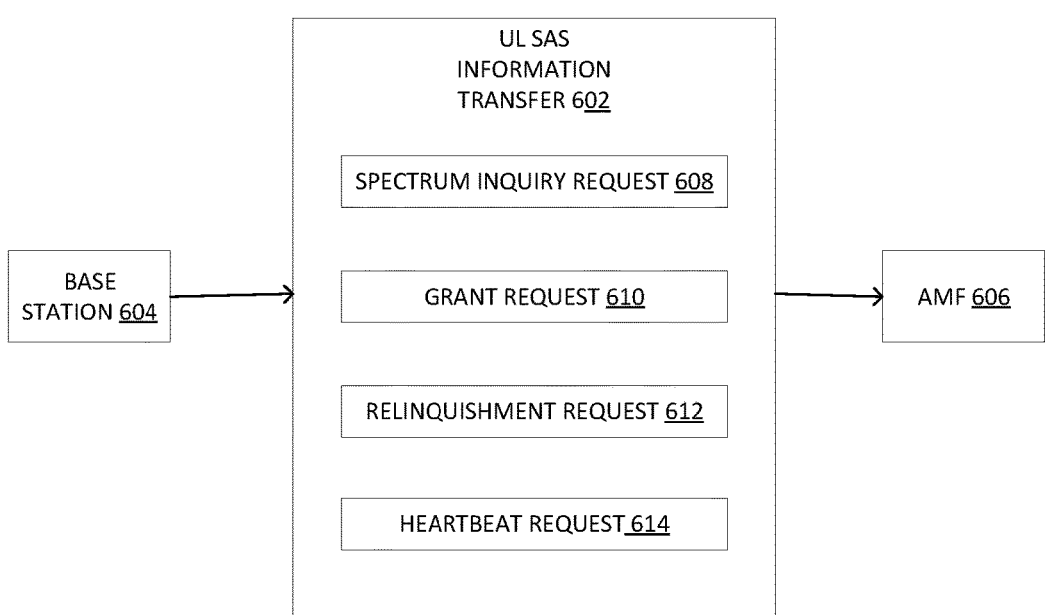
UL SAS
INFORMATION
TRANSFER 602
SPECTRUM INQUIRY REQUEST 608
BASE
STATION 604
GRANT REQUEST 610
AMF 606
RELINQUISHMENT REQUEST 612
HEARTBEAT REQUEST 614
FIG. 6

700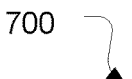
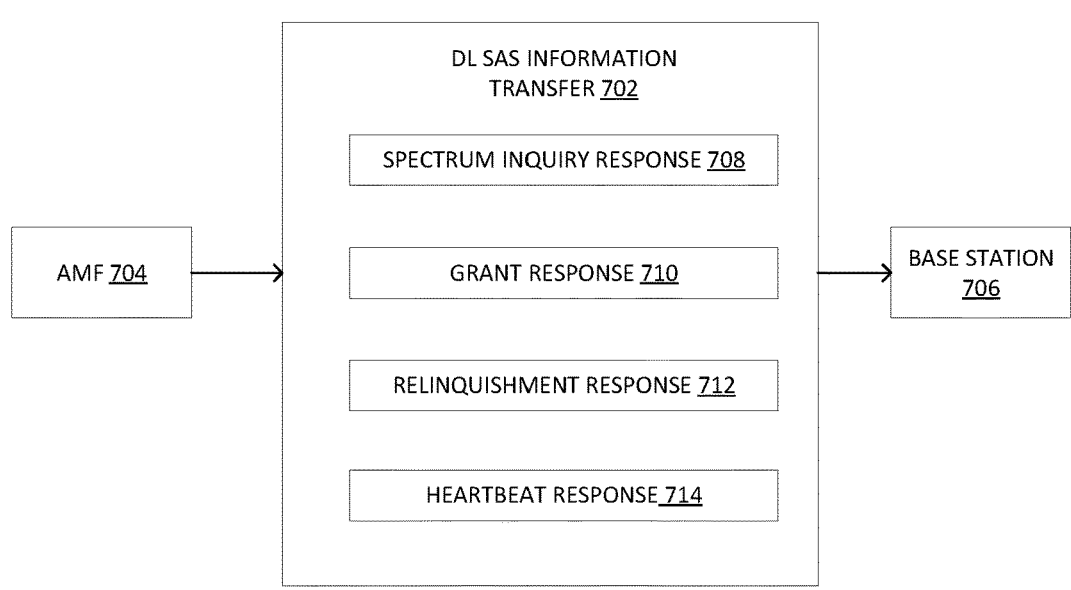
FIG. 7

800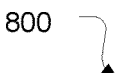
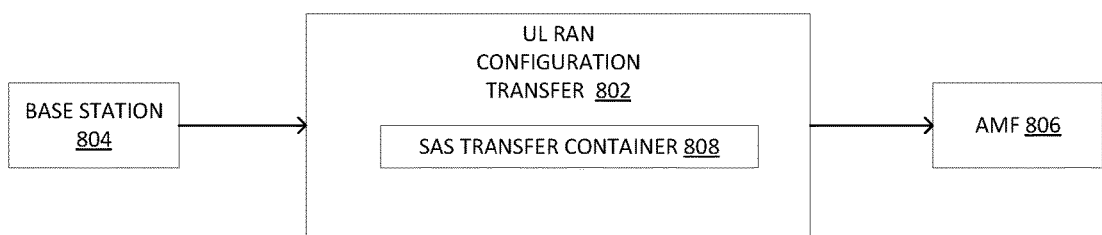
FIG. 8

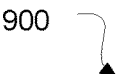
900
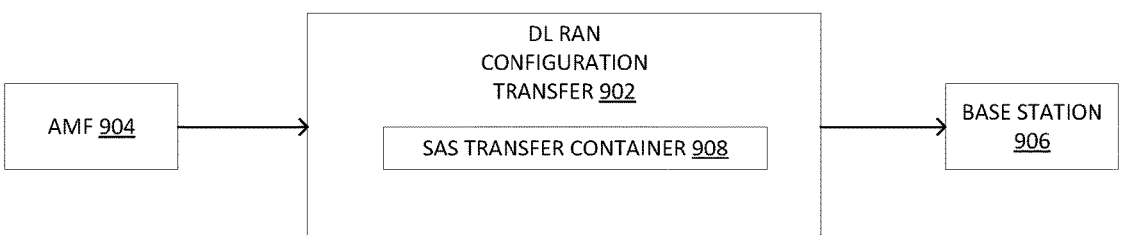
FIG. 9

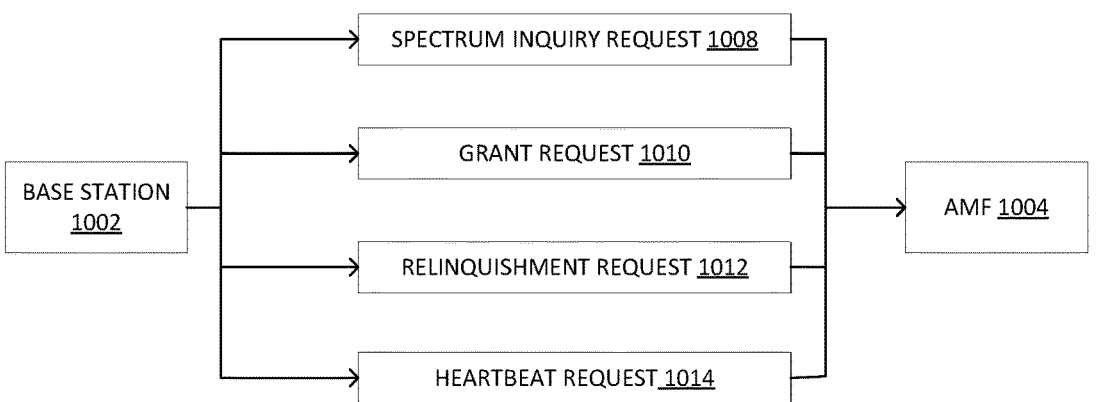
FIG. 10

1100
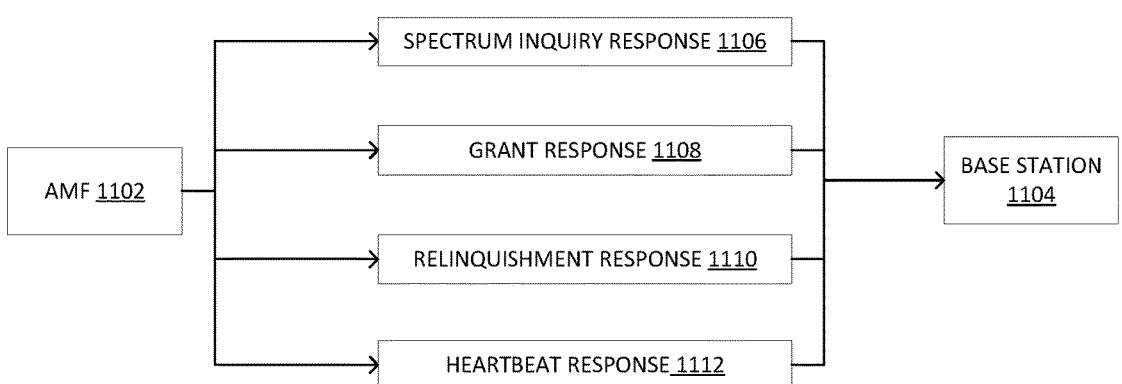
FIG. 11

1300

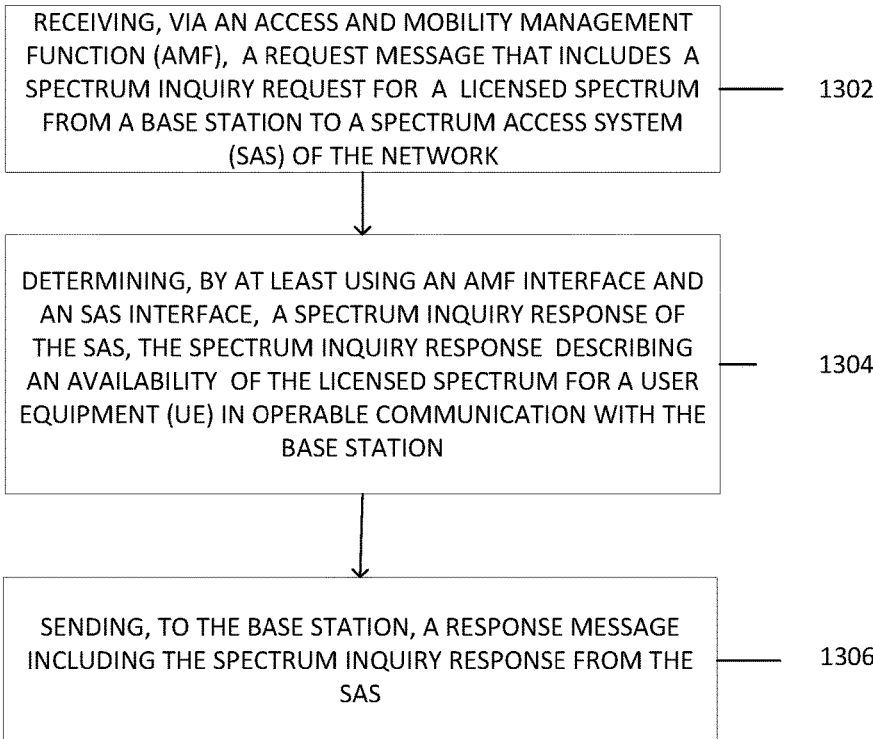

RECEIVING, VIA AN ACCESS AND MOBILITY MANAGEMENT FUNCTION (AMF), A REQUEST MESSAGE THAT INCLUDES A SPECTRUM INQUIRY REQUEST FOR A LICENSED SPECTRUM FROM A BASE STATION TO A SPECTRUM ACCESS SYSTEM (SAS) OF THE NETWORK — 1302

DETERMINING, BY AT LEAST USING AN AMF INTERFACE AND AN SAS INTERFACE, A SPECTRUM INQUIRY RESPONSE OF THE SAS, THE SPECTRUM INQUIRY RESPONSE DESCRIBING AN AVAILABILITY OF THE LICENSED SPECTRUM FOR A USER EQUIPMENT (UE) IN OPERABLE COMMUNICATION WITH THE BASE STATION — 1304

SENDING, TO THE BASE STATION, A RESPONSE MESSAGE INCLUDING THE SPECTRUM INQUIRY RESPONSE FROM THE SAS — 1306

PERFORMING A PERIODIC SPECTRUM INQUIRY OF A  LICENSED SPECTRUM FOR AN AVAILABILITY OF A SPECTRUM — 1402

PUBLISHING THE AVAILABILITY OF THE SPECTRUM TO A BASE STATION — 1404

HARMONIZATION OF SPECTRUM ACCESS TIER AND CORE NETWORK ARCHITECTURE

CROSS-REFERENCES TO RELATED APPLICATIONS

This application is claims priority under 35 U.S.C. § 119(e) to U.S. Provisional Application No. 63/331,141, filed on Apr. 14, 2022, entitled "HARMONIZATION OF SPECTRUM ACCESS TIER AND CORE NETWORK ARCHITECTURE," the contents of which is herein incorporated by reference.

BACKGROUND

Cellular communications can be defined in various standards to enable communications between a user equipment and a cellular network. For example, the Fifth generation mobile network (5G) is a wireless standard that aims to improve upon data transmission speed, reliability, availability, and more.

BRIEF DESCRIPTION OF THE DRAWINGS

FIG. 4 illustrates an example of a CN architecture that incorporates an SAS, in accordance with some embodiments.

FIG. 6 illustrates an example of a message from a base station to an access and mobility function (AMF), in accordance with some embodiments.

FIG. 7 illustrates an example of a message from an AMF to a base station, in accordance with some embodiments.

FIG. 8 illustrates an example of a message from a base station to an AMF, in accordance with some embodiments.

FIG. 9 illustrates an example of a message from an AMF to a base station, in accordance with some embodiments.

FIG. 10 illustrates an example of messages from a base station to an AMF, in accordance with some embodiments.

FIG. 11 illustrates an example of messages from an AMF to a base station, in accordance with some embodiments.

FIG. 13 illustrates an example of an operational flow/algorithmic structure for harmonization of a spectrum access tier and a network architecture, in accordance with some embodiments.

DETAILED DESCRIPTION

Figure 1:
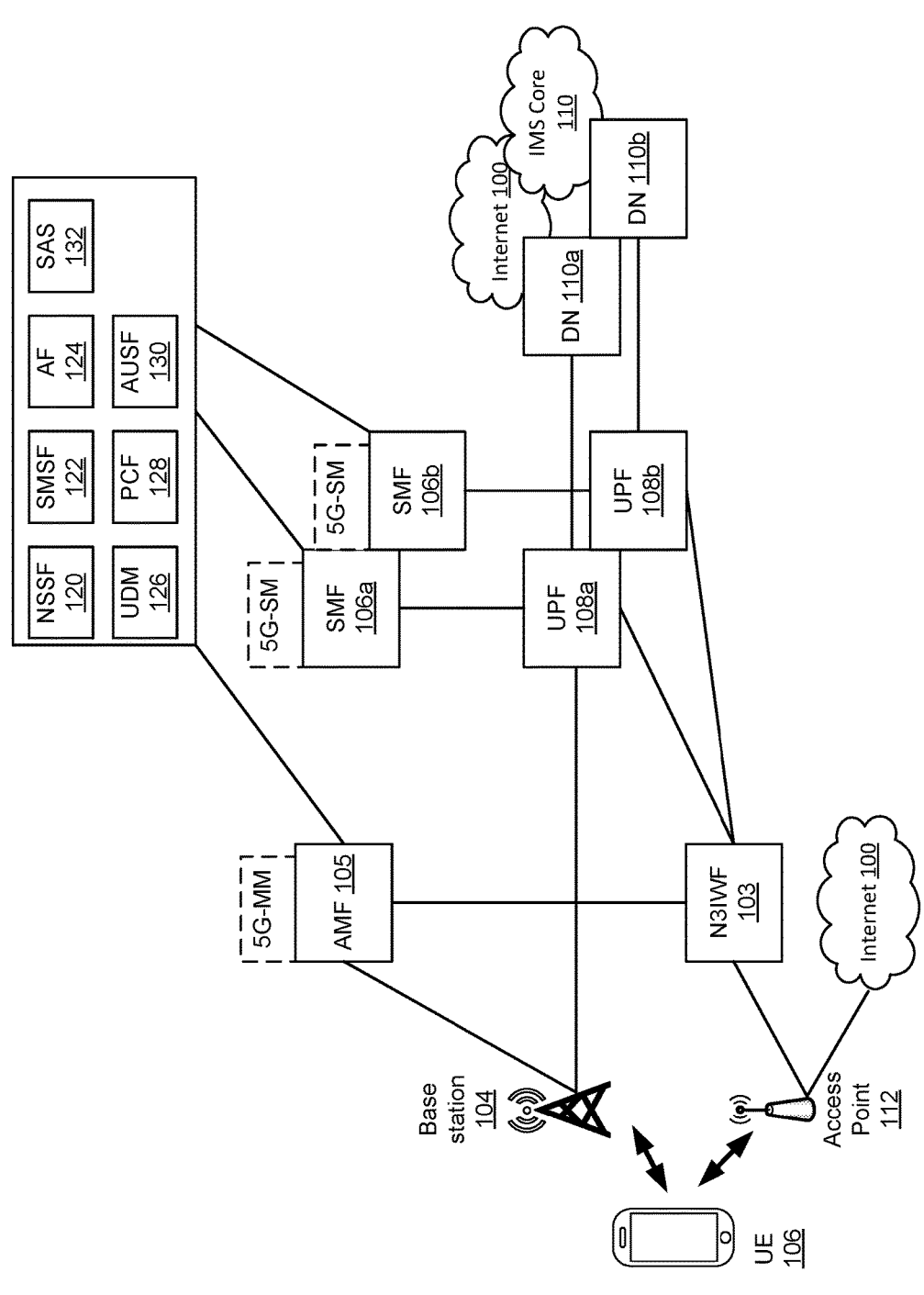
FIG. 1 illustrates an example of a network architecture that incorporates both 3GPP (e.g., cellular) and non-3GPP (e.g., non-cellular) access to a core network (CN), in accordance with some embodiments.

The following detailed description refers to the accompanying drawings. The same reference numbers may be used in different drawings to identify the same or similar elements. In the following description, for purposes of explanation and not limitation, specific details are set forth, such as particular structures, architectures, interfaces, techniques, etc. In order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Spectrum sharing enables multiple categories of user devices to share the same frequency bands for transmitting and receiving communications. As user demand for spectrum increases, service providers will need to offer new frequency ranges to satisfy the demand. The new frequency ranges that were previously unavailable to users tend to be high-frequency ranges (e.g., THz), which have limitations in terms of signal propagation. Therefore, a need exists for increased spectrum sharing in lower frequency ranges.

A spectrum access tier is a shared spectrum of a second network available for sharing for use by base stations of a cellular network (e.g., a first network that includes a core network). The spectrum access tier can be managed by an automated frequency coordinator. The spectrum access tier can provide supplemental spectrum capacity to the network. One example of a spectrum access tier is incorporated in the Citizen's Broadband Radio Service (CBRS), which is a network architecture defined by WINNF-TS-0016. In one example, the CBRS includes a spectrum from 150 MHz in the 3550 MHz to 3700 MHz range shared by three tiers of users. The first tier includes incumbent access users, who are grandfathered users, such as fixed satellite services. The second tier includes priority access licensees (PAL), who are users that have acquired a portion of the frequency band through a competitive bidding process. The third tier includes general authorized access (GAA) users, who are users that can use frequencies not previously assigned to one of the higher tier users.

The CBRS spectrum is managed by a spectrum access service, which is an example of an automated frequency coordinator. The SAS, or more generally, the automated frequency coordinator can determine whether providing spectrum access tier to a base station will impact another entity using the licensed spectrum (e.g., a second network). The SAS is a separate cloud-based network entity that manages Citizen's Broadband Service Devices (CBSDs) that transmit on the CBRS frequency band via an SAS-CBSD interface. None of the CBRS, SAS, or CBSD are incorporated into the $3^{rd}$ Generation Partnership Project (3GPP) architecture. A related entity, the environmental sensing capability (ESC), is a network of sensors used to detect certain incumbent users in protection zones. The ESC can inform the SAS of a radar operating in a protection zone to ensure that no other user has access to the same CBRS frequency bands during a radar operation.

Embodiments described herein enable the harmonization of the CBRS and a network architecture via an SAS. As described herein, an SAS can be incorporated into the network architecture as a network function (NF). An NF can be implemented as special circuitry or as computer-readable instructions stored in one or more memory and executable by one or more processors. The special circuitry and/or the combination of the one or more memory and the one or more processors represent an implementation of the NF. In the event that a base station needs additional spectrum, the base station can transmit a request to the SAS for CBRS spectrum. The SAS can determine the availability of CBRS spectrum and respond to the base station. The SAS can further offer a service that allows consumers to subscribe to SAS-related events, such as publishing available or unavailable spectrum to consumers. In this sense, a base station that is a consumer can receive information on available and unavailable spectrum without having to transmit a spectrum inquiry request.

Embodiments described herein provide certain benefits by incorporating the SAS into the network as an NF. For example, a base station can access the SAS via a next generation (NG) interface, and therefore no new interface needs to be incorporated into the network architecture. In some embodiments, the NG can be enhanced to support a subset of CBRS-SAS functionality. Additionally, in some embodiments, the CBSD-SAS interface can be simplified, as the network can assume functionalities (e.g., authentication and registration) from the CBSD-SAS interface. Another benefit is that the SAS can expose CBRS spectrum availability to different network nodes which can use the information for network optimization. Yet another benefit, in some embodiments, is that the base station can perform sensing, which reduces the workload of the ESC.

Embodiments of the present disclosure are described in connection with 5G networks. However, the embodiments are not limited as such and similarly apply to other types of communication networks, including other types of cellular networks.

In the interest of clarity of explanation, various embodiments are described herein by using CBRS and an SAS function. CBRS is an example of a spectrum access tier of a network available for sharing for use by base stations of another network. SAS is an example of an automated spectrum coordinator implemented as a network function of the other network. However, the embodiments of the present disclosure are not limited as such. Instead, the embodiments equivalently apply to any such spectrum access tier and any such network function implemented to manage the sharing of the licensed spectrum. It should be appreciated that although the above CBRS example describes three tiers, a network can include one or more tiers.

The following is a glossary of terms that may be used in this disclosure.

The term "circuitry" as used herein refers to, is part of, or includes hardware components, such as an electronic circuit, a logic circuit, a processor (shared, dedicated, or group), or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device, including a wireless communications interface.

The term "base station" as used herein refers to a device with radio communication capabilities that is a network component of a communications network (or, more briefly, a network) and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "network" as used herein refers to a communications network that includes a set of network nodes configured to provide communications functions to a plurality of user equipment via one or more base stations. For instance, the network can be a public land mobile network (PLMN) that implements one or more communication technologies, including, for instance, 5G communications.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services and may include computing or network resources. System resources may be considered as a set of coherent functions, network data objects or services accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link," as used herein, refers to a connection between two devices for the purpose of transmitting and receiving information.

The terms "instantiate," "instantiation," and the like as used herein refer to the creation of an instance. An "instance" also refers to a concrete occurrence of an object, which may occur, for example, during the execution of program code.

The term "connected" may mean that two or more elements at a common communication protocol layer have an established signaling relationship with one another over a communication channel, link, interface, or reference point.

The term "network element" as used herein refers to physical or virtualized equipment or infrastructure used to provide wired or wireless communication network services. The term "network element" may be considered synonymous with or referred to as a networked computer, networking hardware, network equipment, network node, virtualized network function, or the like.

The term "information element" refers to a structural element containing one or more fields. The term "field" refers to individual contents of an information element or a data element that contains content. An information element may include one or more additional information elements.

The term "3GPP Access" refers to accesses (e.g., radio access technologies) that are specified by 3GPP standards. These accesses include, but are not limited to, GSM/GPRS, LTE, LTE-A, or 5G NR. In general, 3GPP access refers to various types of cellular access technologies.

The term "Non-3GPP Access" refers to any accesses (e.g., radio access technologies) that are not specified by 3GPP standards. These accesses include, but are not limited to, WiMAX, CDMA2000, Wi-Fi, WLAN, or fixed networks. Non-3GPP accesses may be split into two categories, "trusted" and "untrusted": Trusted non-3GPP accesses can interact directly with an evolved packet core (EPC) or a 5G core (5GC), whereas untrusted non-3GPP accesses interwork with the EPC/5GC via a network entity, such as an Evolved Packet Data Gateway or a 5G NR gateway. In general, non-3GPP access refers to various types of non-cellular access technologies.

FIG. 1 illustrates an example of a 5G network architecture that incorporates both 3GPP (e.g., cellular) and non-3GPP (e.g., non-cellular) access to a 5G core network (CN) in accordance with some embodiments. As shown, a UE 106 may access the 5G CN through both a radio access network (RAN, e.g., a base station 104 that can be a gNB) and an access point (AP) 112. The AP 112 may include a connection to the Internet 100 as well as a connection to a non-3GPP inter-working function (N3IWF) 103 network entity. The N3IWF may include a connection to a core access and mobility management function (AMF) 105 of the 5G CN. The AMF 105 may include an instance of a 5G mobility management (5G MM) function associated with the UE 106. In addition, the RAN (e.g., the base station 104) may also have a connection to the AMF 105. Thus, the 5G CN may support unified authentication over both connections as well as allow simultaneous registration for UE 106 access via both gNB 104 and AP 112. As shown, the AMF 105 may include one or more functional entities associated with the 5G CN (e.g., network slice selection function (NSSF) 120, short message service function (SMSF) 122, application function (AF) 124, unified data management (UDM) 126, policy control function (PCF) 128, or authentication server function (AUSF) 130). Note that these functional entities may also be supported by a session management function (SMF) 106*a* and an SMF 106*b* of the 5G CN. The AMF 105 may be connected to (or in communication with) the SMF 106*a*. Further, the base station 104 may be in communication with (or connected to) a user plane function (UPF) 108*a* that may also be in communication with the SMF 106*a*. Similarly, the N3IWF 103 may be communicating with a UPF 108*b* that may also be communicating with the SMF 106*b*. Both UPFs may be communicating with the data network (e.g., DN 110*a* and 110*b*) or the Internet 100 and Internet Protocol (IP) Multimedia Subsystem/IP Multimedia Core Network Subsystem (IMS) core network 110.

Generally, base station 104 communicates over a transmission medium with one or more UEs (e.g., including the UE 106). Each of the user devices may be referred to herein as a "user equipment" (UE). The base station (BS) 104 may be a base transceiver station (BTS) or cell site (a "cellular base station") and may include hardware that enables wireless communication with the UE 106.

The communication area (or coverage area) of the base station 104 may be referred to as a "cell." The base station 104 and the UE 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. If the base station 104 is implemented in the context of LTE, it may alternately be referred to as an 'eNodeB' or 'eNB'. If the base station 104 is implemented in the context of 5G NR, it may alternately be referred to as 'gNodeB' or 'gNB'.

The base station 104 may also be equipped to communicate with a network (e.g., a core network of a cellular service provider, such as the 5G CN, a telecommunication network, such as a public switched telephone network (PSTN), or the Internet, among various possibilities). Thus, the base station 104 may facilitate communication between the user devices or between the UE 106 and the network. In particular, the cellular base station 104 may provide UEs 106 with various telecommunication capabilities, such as voice, SMS, or data services.

The base station 104 and other similar base stations operating according to the same or a different cellular communication standard may thus be provided as a network of cells, which may provide continuous or nearly continuous overlapping service to UE 106 and similar devices over a geographic area via one or more cellular communication standards.

Thus, while base station 104 may act as a "serving cell" for UE 106, as illustrated in FIG. 1, the UE 106 may also be capable of receiving signals from (and possibly within communication range of) one or more other cells, which may be referred to as "neighboring cells." Such cells may also be capable of facilitating communication between user devices or between user devices and the network 100. Such cells may include "macro" cells, "micro" cells, "pico" cells, or cells that provide any of various other granularities of service area size.

In some embodiments, the base station 104 may be a next generation base station, e.g., a 5G New Radio (5G NR) base station, or "gNB". In some embodiments, a gNB may also be connected to a legacy evolved packet core (EPC) network or to a NR core (NRC) network. In addition, a gNB cell may include one or more transition and reception points (TRPs). In addition, a UE capable of operating according to 5G NR may be connected to one or more TRPs within one or more gNBs.

The UE 106 may be capable of communicating using multiple wireless communication standards. For example, the UE 106 may be configured to communicate using a wireless networking (e.g., Wi-Fi) or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), or any other wireless communication protocol, if desired. Other combinations of wireless communication standards (including more than two wireless communication standards) are also possible.

Figure 2:
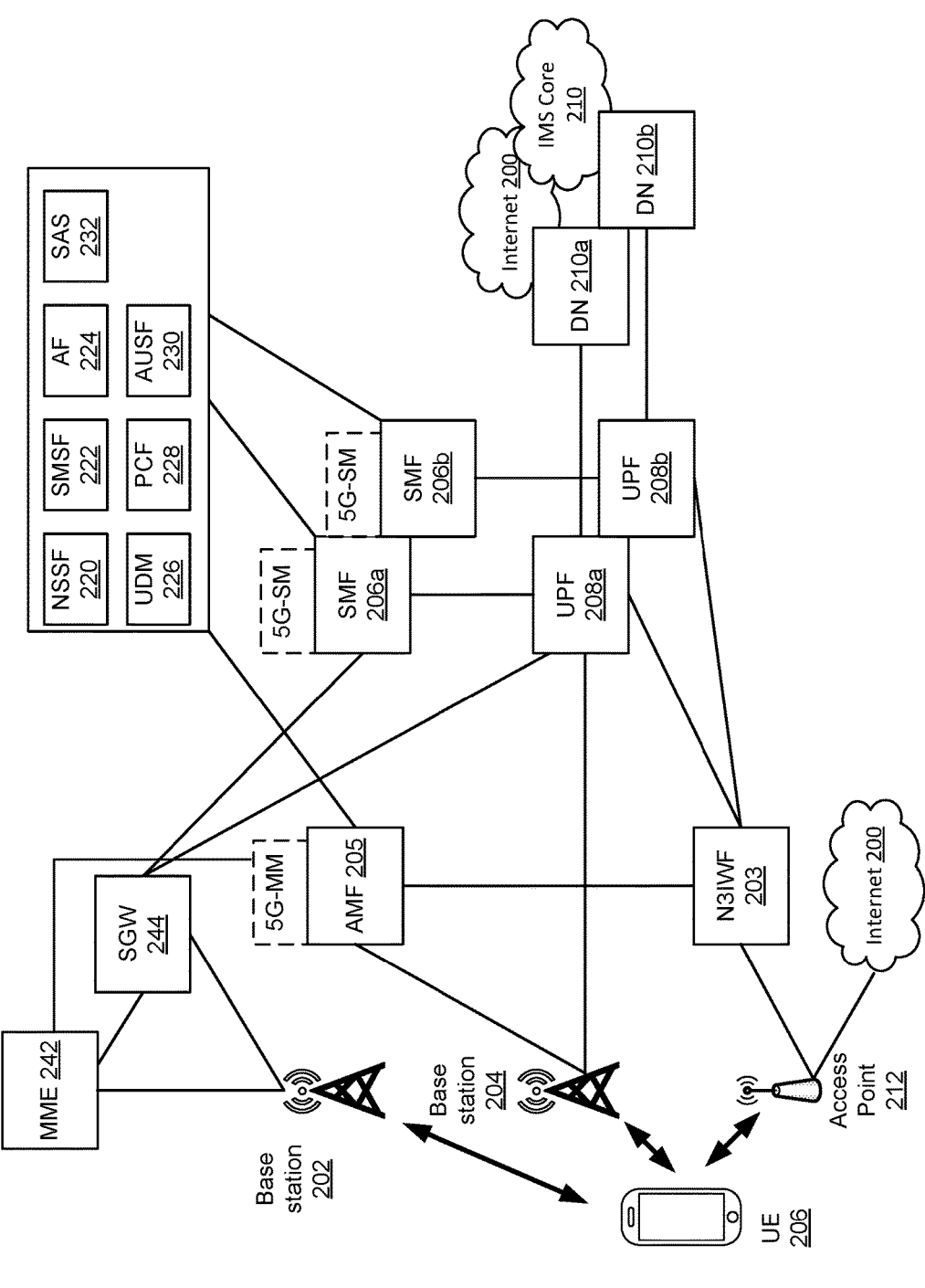
FIG. 2 illustrates an example of a network architecture that incorporates both dual 3GPP access and non-3GPP access to the CN, in accordance with some embodiments.

FIG. 2 illustrates an example of a 5G network architecture that incorporates both dual 3GPP (e.g., LTE and 5G NR) access and non-3GPP access to the 5G CN, in accordance with some embodiments. As shown, a UE 206 may access the 5G CN through both a RAN (e.g., a base station 204, such as gNB) and an AP 212. The AP 212 may include a connection to the Internet 200 as well as a connection to an N3IWF 203 network entity. The N3IWF 203 may include a connection to an AMF 205 of the 5G CN. The AMF 205 may include an instance of a 5G MM function associated with the UE 206. In addition, the RAN (e.g., the base station 204) may also have a connection to the AMF 205. Thus, the 5G CN may support unified authentication over both connections as well as allow simultaneous registration for UE 206 access via both the base station 204 and the AP 212. In addition, the 5G CN may support dual-registration of the UE 106 on both a legacy network (e.g., LTE via a base station 202, such as an eNB) and a 5G network (e.g., via the base station 204). As shown, the base station 202 may have connections to a mobility management entity (MME) 242 and a serving gateway (SGW) 244. The MME 242 may have connections to both the SGW 244 and the AMF 205. In addition, the SGW 244 may have connections to both an SMF 206a and a UPF 208a. As shown, the AMF 205 may include one or more functional entities associated with the 5G CN (e.g., NSSF 220, SMSF 222, AF 224, UDM 226, PCF 228, or AUSF 230). The UDM 226 may also include a home subscriber server (HSS) function, and the PCF 228 may also include a policy and charging rules function (PCRF). These functional entities may also be supported by an SMF 206a and an SMF 206b of the 5G CN. The AMF 205 may be connected to (or in communication with) the SMF 206a. Further, the base station 204 may be in communication with (or connected to) the UPF 208a that may also be in communication with the SMF 206a. Similarly, the N3IWF 203 may be communicating with a UPF 208b that may also be communicating with an SMF 206b. Both UPFs may be communicating with the data network (e.g., DN 210a and 210b) or the Internet 200 and an IMS core network 210.

Figure 3:
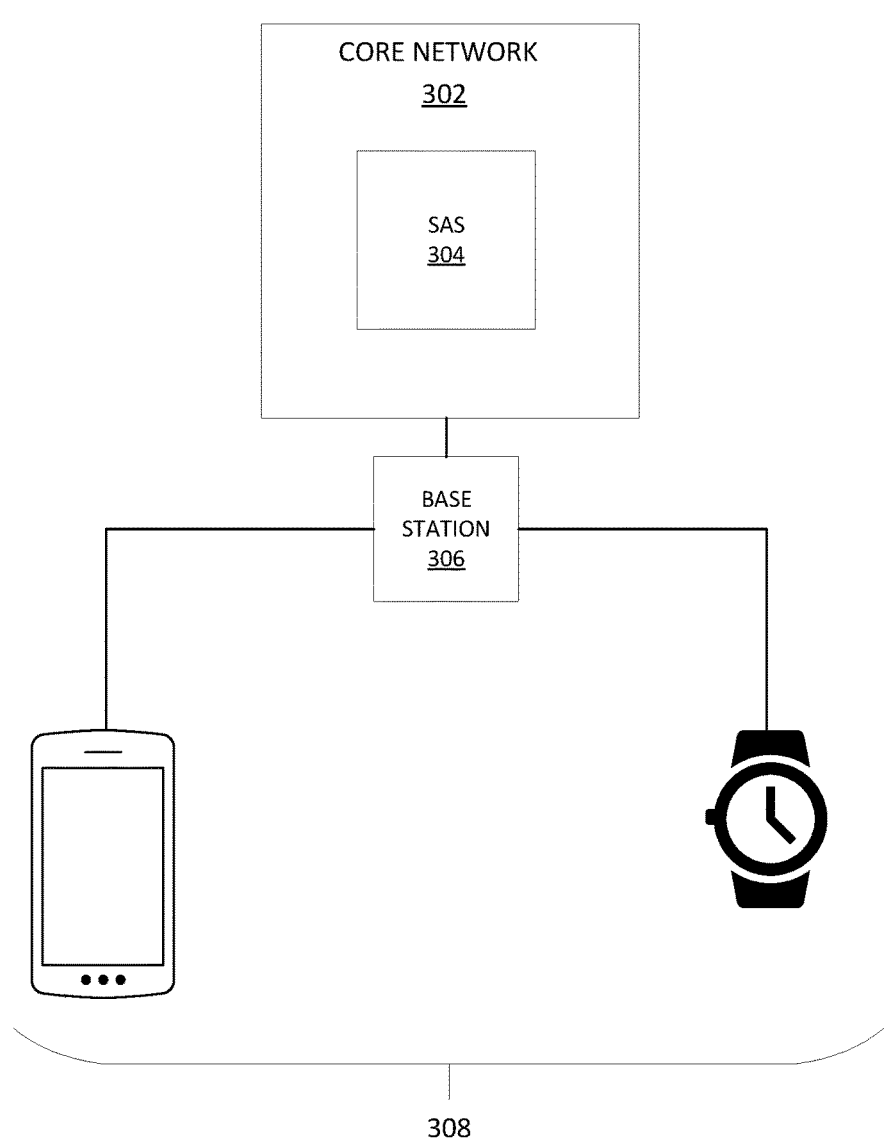
FIG. 3 illustrates an example of a CN architecture that incorporates an automated frequency coordinator, in accordance with some embodiments.

FIG. 3 illustrates an example of a 5G system 300. A CN 302 can incorporate an SAS 304 as an NF. The CN 302 can include a 5G CN. It should be appreciated that the CN 302 can be a sixth generation (6G) CN in that a 6G CN architecture is comparable with a 5G CN architecture. A base station 306 (an example of the base station 104) can receive a connection request from a UE 308 (an example of the UE 106). The base station 306 can transmit a registration request from the UE 308 to the SAS 304. The registration request can include installation parameters such as an owner, location, and transmission characteristics. The SAS 304 can respond with a registration response and either approve or reject the registration request. If the SAS 304 approves the request, it provides a unique identifier for the UE 308. If the SAS rejects the request, an error message can be sent to the base station 306.

The base station 306 can transmit a spectrum inquiry request to the SAS 304. For example, the base station 306 can anticipate a need for additional spectrum and transmit the spectrum inquiry request. The SAS 304 can respond with a spectrum inquiry response, which includes information about which frequency bands in the CBRS band are available for selection by the base station 306. The spectrum inquiry response can include additional information that may guide the base station 306 in its selection process. The selection can be based on which frequency band that the base station 306 would like to operate in. The base station 306 can transmit a grant request to the SAS 304 to reserve the selected frequency band(s). For example, the anticipated demand can become a need for the additional spectrum for the base station 306. In response to the need for additional spectrum, the base station 306 can transmit the grant request. In some instances, the SAS 304 approves or rejects the requests based on preserving spectrum for higher-tiered users. If the SAS 304 approves the grant request, the SAS 304 transmits a grant response to the base station 306 that includes a grant identifier. If the SAS 304 rejects the request, it transmits a grant response to the base station 306 that includes a rejection.

In response to receiving an approval of the grant request, the base station 306 transmits a heartbeat request to the SAS 304 for the authorization to transmit on the granted frequency band(s). The SAS 304 can transmit a heartbeat response to the base station 306. The heartbeat response can authorize the grant, terminate the grant, or suspend the grant. An authorization allows the base station 306 to transmit on the granted frequency band(s). A termination can mean the base station is not allowed to transmit on the granted frequency band(s), and a suspension can mean the base station cannot temporally transmit on the granted frequency band(s).

In the instance that the base station 306 no longer wishes to use the granted frequency spectrum, it transmits a relinquishment request to the SAS 304. In response, the SAS 304 can transmit a relinquishment response to the base station 306. The relinquishment response can either grant the relinquishment request or deny the relinquishment request. In response to receiving a grant of the relinquishment request, the base station 306 can transmit a deregistration request to the SAS 304. The deregistration request can indicate that the UE 308 no longer wishes to be registered with the SAS 304 under the parameters sent under the registration request.

FIG. 4 illustrates an example of a system 400. The CN 402 can include a CN. It should be appreciated that the CN 402 can be a sixth generation (6G) CN in that a 6G CN architecture is comparable with a CN architecture. The CN 402 can include an AMF 404 in communication with an underlay network 406. The underlay network 406 can enable communication with the SAS 408. The SAS can be implemented as an NF of the CN 402. A UE 410 can be in communication with a base station 412. The base station 412 can be in communication with the CN 402. The CN 402 can be any CN, such as the CN 302 of FIG. 3. The base station 412 can be any base station, such as the base station 306 of FIG. 3.

The base station 412 can communicate with the AMF 404 via an NG interface (NG) 414. The NG 414 connects the base station 412 to the CN 402. A control plane of the NG permits signaling between the base station 412 and the AMF 404. The user plane of the NG 414 permits the transfer of application data between the base station 412 and the AMF 404. In embodiments described herein, the NG 414 can be configured to transmit and receive messages between the base station 412 and the SAS 408 via the AMF 404. The messages are described with more particularity with respect to FIGS. 6-11.

The AMF 404 can communicate with an Namf interface (Namf) 416 via the underlay network 406. The Namf 416 can be a service-based interface for the AMF 404. The Namf 416 is configured to transmit request messages from the base station 412 to the underlay network 406. The Namf 416 is further configured to receive SAS messages from the underlay network 406 and transmit them to the base station 412. The via the underlay network 406 enables communication between the SAS 408 and the AMF 404. The Namf 416 is further configured to receive SAS messages via the underlay network 406 and transmit them to the base station 412. The Nsas 418 is configured to receive base station messages via the underlay network 406 and transmit the messages to the SAS 408. The Nsas 418 is further configured to receive SAS messages from the SAS 408 and transmit them to the base station 412 via the underlay network 406. The Nsas 418 can be a service-based interface for the SAS 408. For example, the Nsas 418 can offer a communication service (Nsas Communication). This service can support the following messages spectrum inquiry request, spectrum inquiry response, grant request, grant response, heartbeat request, heartbeat response, grant relinquishment request, and grant relinquishment response. The Nsas 418 can also offer an event exposure service (Nsas_EventExposure). This service can allow consumers to subscribe to SAS-related events, such as notifications for available and unavailable spectrum. The AMF 404 can further push this spectrum availability information to a base station without the base station requesting the information. The AMF 404 can perform this push notification via a NG-AP message as described below in FIGS. 6 and 7, or via an AMF Configuration Update message.

Figure 5:
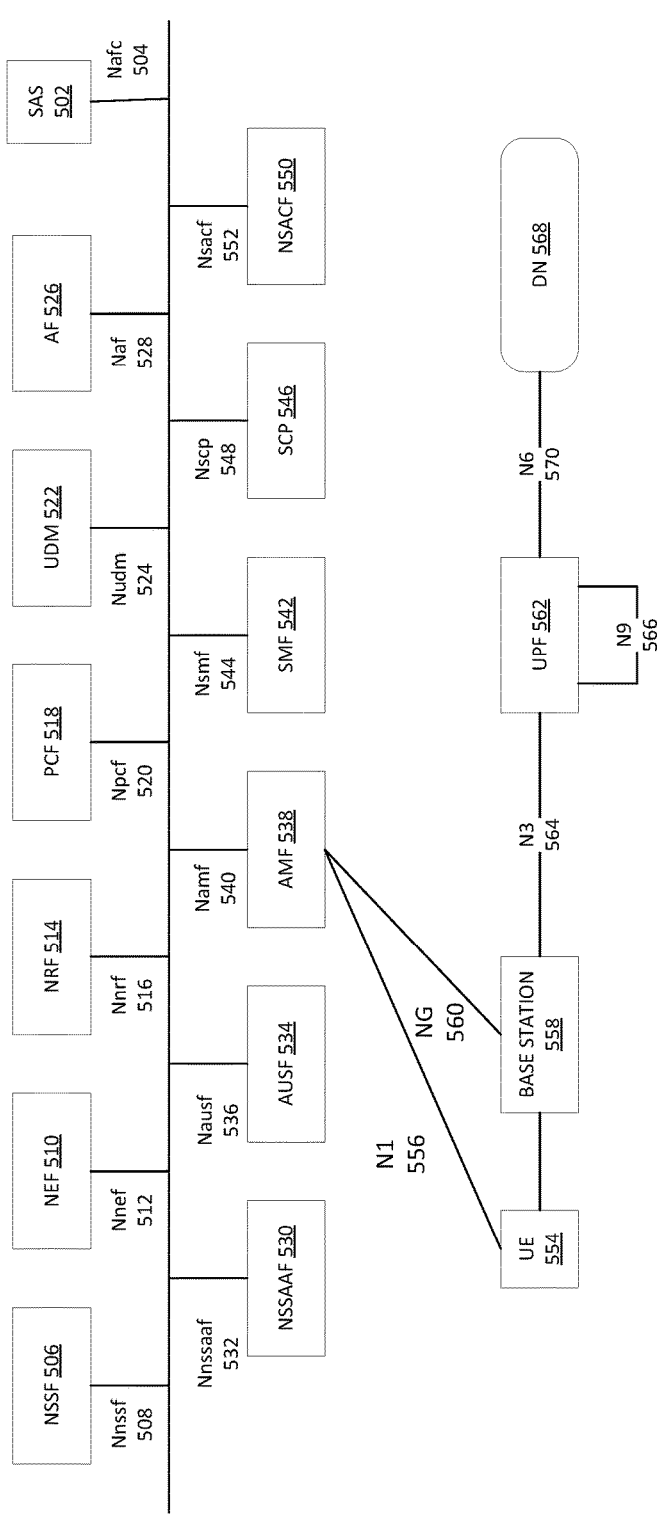
FIG. 5 illustrates an example of a CN architecture that incorporates an SAS, in accordance with some embodiments.

FIG. 5 illustrates an example of a CN 500. The CN 500 can include a 5G CN. It should be appreciated that the CN 500 can be a sixth generation (6G) CN in that a 6G CN architecture is comparable with a 5G CN architecture. A SAS 502 can be added to the CN 500 as an NF. The SAS 502 can communicate with the CN 500 via an Nsas 504, a control plane interface exhibited by the SAS 502. The Nsas 504 supports a subset of the CBRS-SAS interface. The Nsas 504 can be a service-based interface that exposes a spectrum access system application programming interface (SAS API) to the CN 500. The service can support the following messages: spectrum inquiry (request and response), grant (request and response), grant relinquishment (request and response), and heartbeat (request and response). The service can also allow consumers to subscribe to SAS-related events, such as spectrum becoming available or unavailable.

The CN 500 further includes a network splice selection function (NSSF) 506. The NSSF 506 can be a control plane function that can verify that a UE is subscribed to each of the single network slice selection information (S-NSSAI) belonging to a requested S-NSSAI, select one or more network slices to serve the UE and generate an Allowed NSSAI, and identify a set of candidate access and mobility function (AMF) to serve the UE. The NSSF 506 can communicate with the CN 500 via an Nnssf 508, a control plane interface exhibited by the NSSF 506. The CN 500 can further include a network exposure function (NEF) 510. The NEF 510 can be a control plane function that can provide information about NFs within the CN 500 to external NFs. The NEF 510 can communicate with the CN 500 via an Nnef 512, a control plane interface exhibited by the NEF 510. The CN 500 can further include a network repository function (NRF) 514. The NRF 514 can be a control plane function that allows NFs to register their services and allows other NFs to discover those services. The NRF 514 can communicate with the CN 500 via an Nnrf 516, a control plane interface exhibited by the NRF 514. The CN 500 can further include a policy control function (PCF) 518. The PCF 518 can be a control plane function responsible for providing policies associated with mobility management and policies associated with session management. The PCF 518 can communicate with the CN 500 via an Npcf 520, an interface exhibited by the PCF 518. The CN 500 can further include a unified data management (UDM) 522. The UDM 522 can be a control plane function that manages subscriber data and store subscriber data. The UDM can communicate with the CN 500 via an Nudm 524, a control plane interface exhibited by the UDM 522. The CN 500 further includes an application function (AF) 526. The AF 526 can be a control plane function that acts as a server for providing support for specific services. The AF 526 can communicate with the CN 500 via an Naf 528, a control plane interface exhibited by the AF 526.

The CN 500 can further include a network slice specific authentication and authorization function (NSSAAF) 530. The NSSAAF 530 can be a control plane function that can support network splice-specific authentication and authorization. The NSSAAF 530 can communicate with the CN 500 via an Nnssaaf 532, an interface exhibited by the NSSAAF 530. The CN 500 can further include an authentication server function (AUSF) 534. The AUSF 534 is a control plane function that can support both subscriber and network authentication. The AUSF 534 can communicate with the CN 500 via an Nausf 536, an interface exhibited by the AUSF 534. The CN 500 can further include an AMF 538. The AMF 538 can be a control plane function whose responsibilities include registration management, connection management, reachability management, and mobility management. The AMF 538 can communicate with the CN 500 via an Namf 540, an interface exhibited by the AMF 538. The Namf 540 is configured to receive messages from the base station 558 via the AMF 538 and transmit the messages to the SAS 408. The messages from the base station 558 can include a spectrum inquiry request, a grant request, a heartbeat request, and a grant relinquishment request. The Nsas 504 is further configured to receive messages from the SAS 502 and transmit them to the base station 558 via the AMF 538. The messages from the SAS 502 can include a spectrum inquiry response, a grant response, a heartbeat response, and a grant relinquishment response.

The CN 500 can further include a session management function (SMF) 542. The SMF 542 can be a control plane function whose responsibilities include packet data unit (PDU) session management, internet protocol (IP) address allocation, and general packet radio service (GPRS) protocol (GTP-U) tunnel management. The SMF 542 can communicate with the CN 500 via an Nsmf 544, an interface exhibited by the SMF 542. The CN 500 can further include a service communication proxy (SCP) 546. The SCP 546 can be a control plane function that can provide routing control and observability for the CN 500. The SCP 546 can communicate with the CN 500 via an Nscp 548, an interface exhibited by the SCP 546. The CN 500 can further include a network slice administration control function (NSACF) 550. The NSACF 550 can be a control plane function that monitors and controls the number of registers UEs per network slice. The NSACF 550 can communicate with the CN 500 via a Nnsacf 552, an interface exhibited by the NSACF 550.

The CN 500 can be in operable communication with a UE 554. The UE 554 can communicate with the CN 500 via an N1 interface (N1) 556. The UE 554 can be in communication with a base station 558. The UE 554 can also communicate with the CN 500 via the base station 558. The base station 558 can communicate with the CN 500 via an NG (also known as "N2") 560. The herein described NG 560 is configured to support the subset of the CBRS-SAS message functionality. Example message configurations are described with more particularity with respect to FIGS. 6-11.

The base station 558 can communicate with a user plane function (UPF) 562 via an N3 interface (N3) 564. The UPF 562 can include an intermediate UPF (I-UPF) and a UPF session anchor. The I-UPF can communicate with the UPF session anchor via an N9 interface (N9) 566. The UPF 562 can be responsible for routing and forward to user plane packets to an external data network 568 via an N6 interface (N6) 570.

FIGS. 6-11 describe messages that are transmitted between an AMF and a SAS. A message from the AMF to the SAS can be referred to herein as a request message. A message from the SAS to the AMF can be referred as a response message. These messages can be exchanged between the AMF and the SAS by using the above referenced Namf and Nsas. In particular, the AMF sends a request message via its Namf and the SAS receives the request message via its Nsas. Conversely, the SAS sends a response message via its Nsas and the AMF receives the response message via its Namf.

FIGS. 6 and 7 describe next generation application protocol (NG-AP) messages. The NG-AP messages encapsulate SAS-CBSD messages. In particular, the NG-AP messages include requests to a SAS. For example, NG-AP messages to the SAS can include a spectrum inquiry request, a grant request, a heartbeat request, and a grant relinquishment request. Additionally, the NG-AP messages from the SAS can include a spectrum inquiry response, a grant response, a heartbeat response, and a grant relinquishment response. An AMF can be configured to relay the NG-AP messages between the base station and the SAS. The information can be included in the NG-AP messages by enhancing other forms of messages, and yet offer minimum impact to existing base station implementations. Additionally, the NG-AP messages offer transparency of SAS functionality to the AMF, while concealing visibility of the AMF to SAS functionality.

FIG. 6 illustrates a communication flow 600 for an uplink spectrum access system (UL SAS) information transfer 602 between a base station 604 and an AMF 606. The base station 604 can be a base station as described in FIGS. 1-5. The AMF 606 can be an AMF as described in FIGS. 1, 2, 4, and 5. The base station 604 can be configured to transmit the UL SAS information transfer 602 to the AMF 606. The AMF 606 can be configured to receive the UL SAS information transfer 602 from the base station 604. The UL SAS information transfer 602 can be a NG-AP message configured for communication between the base station 604 and a SAS via the AMF 606. The UL SAS information transfer 602 can include multiple messages transmitted as a single message. The UL SAS information transfer 602 can include a spectrum inquiry request 608, a grant request 610, a relinquishment request 612, and a heartbeat request 614. The spectrum inquiry request 608 can be a request to an SAS for identifying spectrum (e.g., one or more frequency bands) that is available from the CBRS. The grant request 610 can be a request to the SAS to reserve a portion(s) of available CBRS spectrum (e.g., one or more available frequency bands). The grant request 610 can be based on one or more available frequency ranges selected by the base station 604. The relinquishment request 612 can be a request to an SAS to relinquish a granted portion of available CBRS spectrum. The heartbeat request 614 can be a request to an SAS for authorization to transmit on a granted portion of available CBRS spectrum.

FIG. 7 illustrates a communication flow 700 for a downlink spectrum access system (DL SAS) information transfer 702 between an AMF 704 and a base station 706. The base station 706 can be a base station as described in FIGS. 1-5. The AMF 704 can be an AMF as described in FIGS. 1, 2, 4, and 5. The AMF 704 can be configured to transmit the DL SAS information transfer 702 to the base station 706. The base station 706 can be configured to receive the DL SAS information transfer 702 from the AMF 704. The DL SAS information transfer 702 can be a next generation application protocol (NG-AP) message configured for communication between the base station 706 and a SAS via the AMF 704. The DL SAS information transfer 702 can include multiple messages transmitted as a single message. The message can include a spectrum inquiry response 708, a grant response 710, a relinquishment response 712, and a heartbeat response 714. The spectrum inquiry response 708 can be a response from an SAS that includes spectrum (e.g., one or more frequency bands) that is available from the CBRS. The grant response 710 can be a response from an SAS, including a grant or denial of a portion of available CBRS spectrum (e.g., one or more frequency bands). The grant response 710 can further include a grant identifier (ID) identifying the granted portion of CBRS spectrum. The relinquishment response 712 can be a response from an SAS granting or denying a relinquishment request. The heartbeat response 714 can be a response from an SAS that includes an authorization of a grant, a termination of a grant, or a suspension of a grant.

FIGS. 8 and 9 describe enhancements of existing messages to encapsulate SAS-CBSD messages. Existing messages can be enhanced to include an SAS transfer container information element (IE). An AMF can be configured to relay the enhanced messages between the base station and the SAS. The information can be included in the enhanced messages by enhancing other forms of messages, and yet offer minimum impact to existing base station implementations. Additionally, the enhanced messages offer transparency of SAS functionality to the AMF, while concealing visibility of the AMF to SAS functionality.

FIG. 8 illustrates a communication flow 800 for a UL RAN configuration transfer 802 between a base station 804 and an AMF 806. The base station 804 can be a base station as described in FIGS. 1-5. The base station 804 can be configured to transmit the UL RAN configuration transfer 802 to the AMF 806. The AMF 806 can be configured to receive the UL RAN configuration transfer 802 from the base station 804. The AMF 806 can be an AMF as described in FIGS. 1, 2, 4, and 5. The UL RAN configuration transfer 802 can be a message from the base station 804 to the AMF 806 that has been modified to include an SAS transfer container 808. The SAS transfer container 808 can include an information element (IE). The IE can include any one or combination of a spectrum inquiry request, a grant request, a relinquishment request, and a heartbeat request.

FIG. 9 illustrates a communication flow 900 for a DL RAN configuration transfer 902 between an AMF 904 and a base station 906. The base station 906 can be a base station as described in FIGS. 1-5. The AMF 904 can be an AMF as described in FIGS. 1, 2, 4, and 5. The AMF 904 can be configured to transmit the DL RAN configuration transfer 902 to the base station 706. The base station 906 can be configured to receive the DL RAN configuration transfer 902 from the AMF 904. The DL RAN configuration transfer 902 can be a message from the AMF 904 to the base station 906 that has been modified to include an SAS transfer container 908. The SAS transfer container 908 can include an IE. The IE can include any one or combination of a spectrum inquiry response, a grant response, a relinquishment response, and a heartbeat response.

FIGS. 10 and 11 describe separate NG-AP messages. These separate NG-AP messages can be counterparts to existing SAS-CBSD messages. A base station can transmit separate NG-AP messages to the SAS. In particular, the base station can separately transmit a spectrum inquiry request, a grant request, a heartbeat request, or a grant relinquishment request to the SAS. Additionally, the SAS can transmit separate NG-AP messages NG-AP messages to the base station. In particular, the SAS can separately transmit a spectrum inquiry response, a grant response, a heartbeat response, and grant relinquishment response to the base station. An AMF can be configured to relay the separate NG-AP messages between the base station and the SAS. A CN can be configured relatively easily to transmit and receive separate NG AP messages with relatively minimal impact on existing base state implementations. Additionally, the enhanced messages offer transparency of SAS information to the AMF.

FIG. 10 illustrates a communication flow 1000 between a base station 1002 and an AMF 1004. The base station 1002 can be a base station as described in FIGS. 1-5. The AMF 1004 can be an AMF as described in FIGS. 1, 2, 4, and 5. The base station 1002 can be configured to transmit separate messages to the AMF 1004. The AMF 1004 can be configured to receive separate messages from the base station 1002. A message can include a spectrum inquiry request 1008, a grant request 1010, a relinquishment request 1012, or a heartbeat request 1014.

FIG. 11 illustrates a communication flow 1100 between an AMF 1102 and a base station 1104. The base station 1104 can be a base station as described in FIGS. 1-5. The AMF 1102 can be an AMF as described in FIGS. 1, 2, 4, and 5. The AMF 1102 can be configured to transmit separate messages to the base station 1104. A message can include a spectrum inquiry response 1106, a grant response 1108, a relinquishment response 1110, or a heartbeat response 1112.

Each of the messages described by FIGS. 6-11 includes IEs to be relayed to either the SAS or the base station. At a minimum, the messages carry a particular IE. Each spectrum inquiry request can include an identification of frequency ranges that a base station is requesting information for. Each spectrum inquiry response can include available channel(s), and for each available channel, a frequency range, a type (e.g., PAL or GAA), and a maximum effective isotropic radiated power (EIRP). Each grant request can include identification of requested frequency range(s), and a maximum EIRP for each requested frequency range. Each grant response can include a response (approved or disapproved), a grant ID, an expiry time, a type (PAL or GAA), and a heartbeat interval (if used). Each heartbeat request can include a grant ID, and each heartbeat response can include a grant ID. Each grant relinquishment request can include a grant ID, and each grant relinquishment response can include a response (approved or disapproved) and a grant ID.

Figure 12:
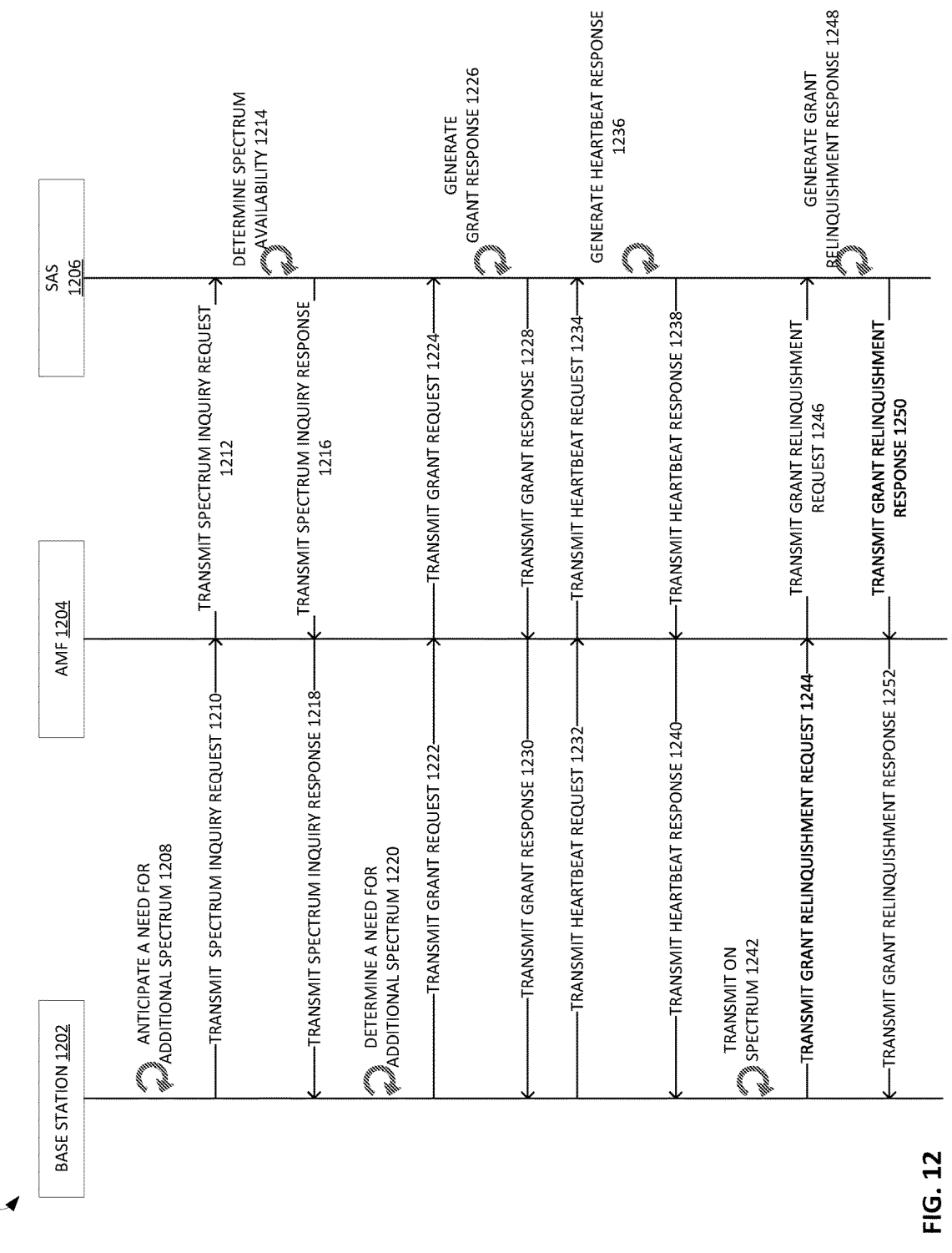
FIG. 12 illustrates an example signaling diagram for harmonization of a spectrum access tier and a network architecture, in accordance with some embodiments.

FIG. 12 is a signaling process diagram 1200 illustrating an exemplary harmonization process according to one or more embodiments. As shown in FIG. 12, a base station 1202, an AMF 1204, and an SAS 1206 can interact with each other. At 1208, the base station 1202 can anticipate a need for additional spectrum. In response to anticipating a need for additional spectrum the base station 1202 can transmit a spectrum inquiry request to the AMF 1204 via an NG at 1210. At 1212, the AMF 1204 can transmit the spectrum inquiry request to the SAS 1206 via an Namf. The SAS 1206 can receive the spectrum inquiry request via a Nsas.

At 1214, the SAS 1206 can determine a spectrum availability. The determination can be based on an availability of spectrum in a CBRS band. The determination can further be based on a tier of the base station 1202. At 1216, the SAS 1206 can transmit a spectrum inquiry response to the AMF 1204 via the Nsas. The spectrum inquiry response can include one or more available frequency bands in the CBRS band. The AMF 1204 can receive the spectrum inquiry response via the Namf. At 1218, the AMF 1204 can transmit the spectrum inquiry response to the base station 1202 via the NG.

At 1220, the base station 1202 determines a need for the available spectrum. In response to determining the need for the available spectrum, the base station 1202 transmits a grant request to the base station 1202 via the NG at 1222. At 1224, the AMF 1204 transmits the grant request to the SAS 1206 via the Namf. The grant request can include a request for a selected frequency band of the one or more available frequency bands. The SAS 1206 receives the grant request via the Nsas. At 1226, the SAS 1206 determines a grant response to the request. The grant response can be approval or rejection of access to the selected frequency band. At 1228, the SAS 1206 transmits the grant response to the AMF 1204 via the Nsas. At 1230, the AMF 1204 transmits the grant response to the base station 1202 via the NG.

At 1232, in response to receiving the grant request, the base station 1202 transmits a heartbeat request to the AMF 1204 via the NG. The heartbeat request can include a request for authorization to transmit on the one or more granted frequency bands. At 1234, the AMF 1204 can transmit the heartbeat request to the SAS 1206 via the Nsas. The SAS 1206 can receive the heartbeat request via the Nsas. At 1236, the SAS 1206 can generate a heartbeat response. The heartbeat response can be an approval of the grant, a termination of the grant, or a suspension of the grant. At 1238, the SAS 1206 can transmit the heartbeat response to the AMF 1204 via the Nsas. The AMF 1204 can receive the heartbeat response via the Namf. At 1240, the AMF 1204 can transmit the heartbeat response to the base station 1202 via the NG interface. At 1242, the base station 1202 can use the granted spectrum. In particular, the base station 1202 can share the granted spectrum with a UE.

At 1244, the base station 1202 can transmit a grant relinquishment request to the AMF via the NG interface. The grant relinquishment request can be a request to relinquish the granted one or more frequency bands. At 1246, the AMF 1204 can transmit the grant relinquishment request to the SAS 1206 via the Namf. The SAS 1206 can receive the grant relinquishment request via the Nsas. At 1248, the SAS 1206 can generate a grant relinquishment response. The grant relinquishment response can be an approval or a rejection of the grant relinquishment request. At 1250, the SAS 1206 can transmit the grant relinquishment response to the AMF 1204 via the Nsas. The AMF 1204 can receive the grant relinquishment response via the Namf. At 1252, the AMF 1204 can transmit the grant relinquishment response to the base station 1202 via the NG.

FIG. 13 illustrates an example operational flow/algorithmic structure 1300 for harmonization of the CBRS and a network architecture, in accordance with some embodiments. At 1302, an AMF of a CN can receive a request message that includes a spectrum inquiry request for identification of available frequency bands of a CBRS spectrum. The request message can be received from a base station via an NG. The base station can make the request based on anticipating a need for additional spectrum. The AMF can transmit the request message to the SAS of the CN via an Namf. The SAS can receive the request message from the AMF via the Nsas.

At 1304, the SAS can identify available frequency bands in the CBRS spectrum. The available frequency bands are bands that can be shared by one or more base stations. Each base station of the one or more base stations can share the available frequency bands with one or more UEs.

At 1306, the SAS can transmit a response message to the base station via the AMF. The response message can include a spectrum inquiry response that includes an identification of available frequency bands of the CBRS spectrum. The SAS can transmit the response message to the AMF via the Nsas. The AMF can receive the response message via the Namf. The AMF can transmit the response message to the base station via the NG.

Figure 14:
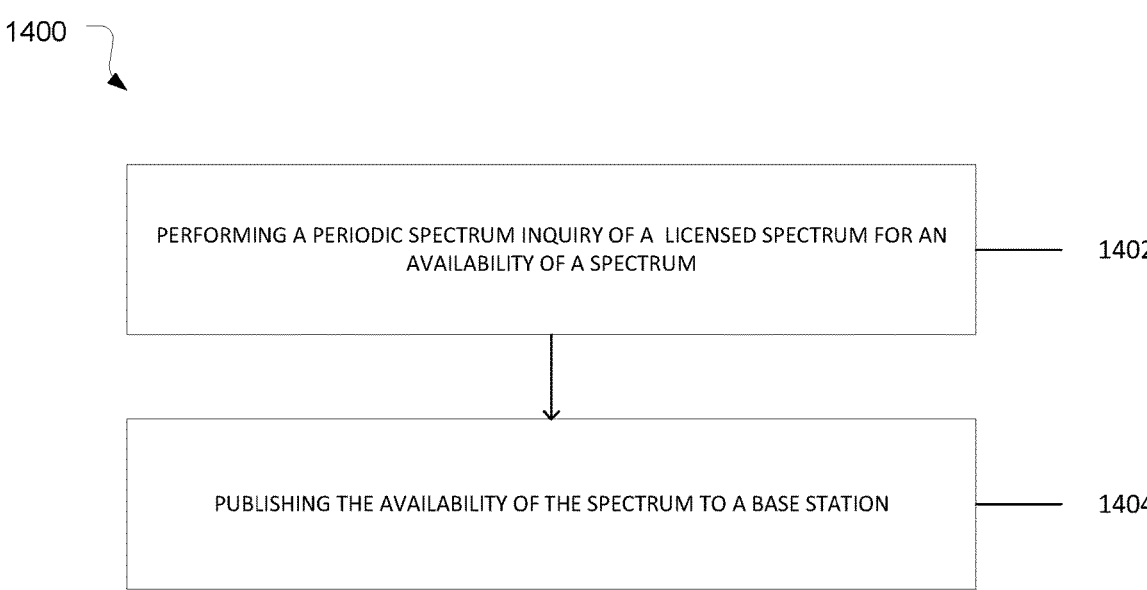
FIG. 14 illustrates an example of an operational flow/algorithmic structure for harmonization of a spectrum access tier and a network architecture, in accordance with some embodiments.

FIG. 14 illustrates an example operational flow/algorithmic structure 1400 for harmonization of the CBRS and a network architecture, in accordance with some embodiments. At 1402, the SAS of a CN can perform a periodic spectrum inquiry of the CBRS to determine the availability of the frequency bands in the CBRS spectrum. The SAS can perform these periodic inquiries without first receiving a spectrum inquiry request from a base station.

At 1404, the SAS can publish available and unavailable frequency bands to service consumers. The AMF can be a service consumer and push this information to a base station. For example, the AMF can use an NG-AP message or an AMF Configuration Update Message to push this information to the base station. The base station can use this information to determine when to transmit a grant request for available frequency bands of the CBRS spectrum.

Figure 15:
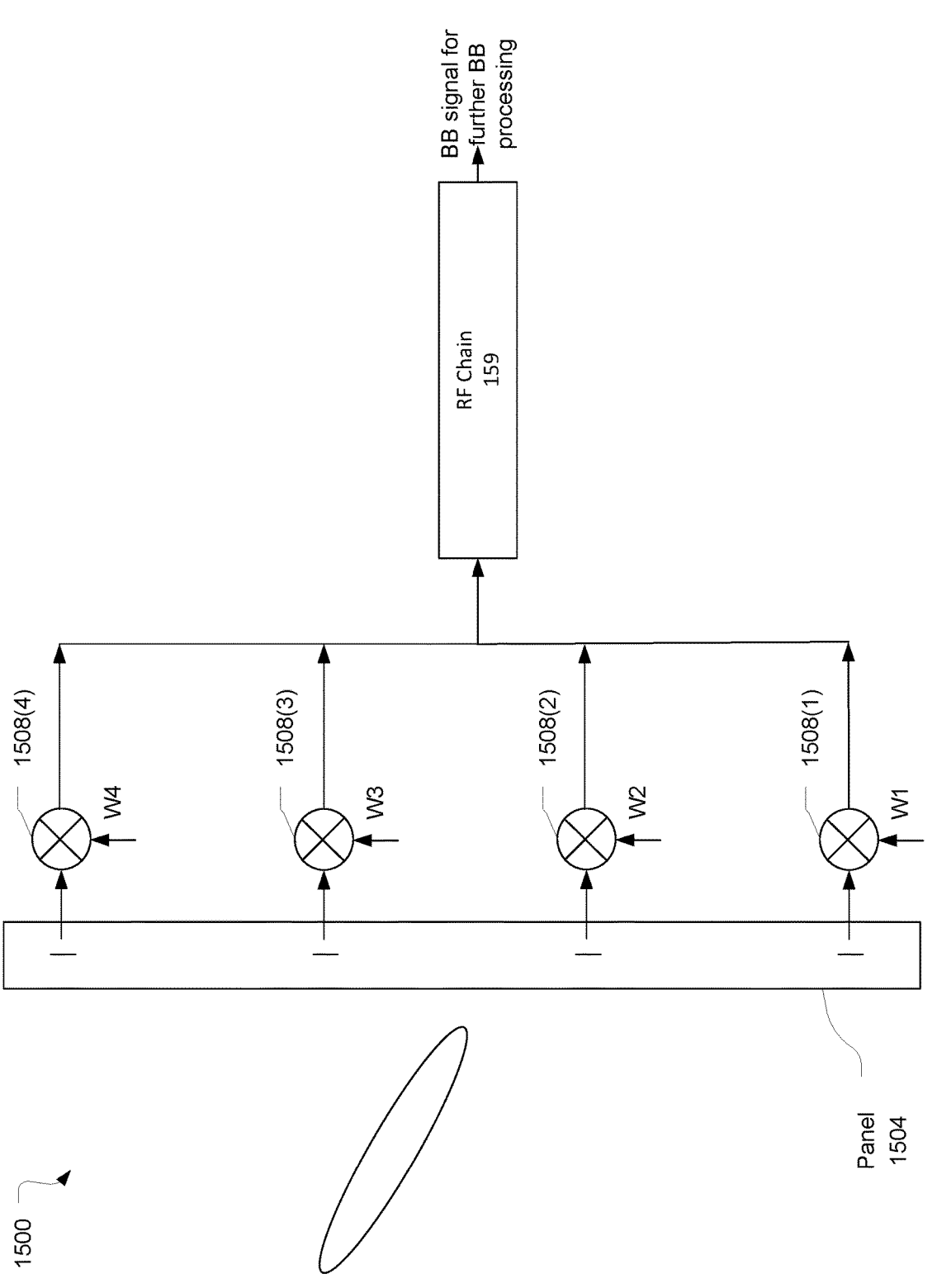
FIG. 15 illustrates an example of receive components, in accordance with some embodiments.

FIG. 15 illustrates receive components 1500 of the UE 106 of FIG. 1, in accordance with some embodiments. The receive components 1500 may include an antenna panel 1504 that includes a number of antenna elements. The panel 1504 is shown with four antenna elements, but other embodiments may include other numbers.

The antenna panel 1504 may be coupled to analog beamforming (BF) components that include a number of phase shifters 1508(1)-1508(4). The phase shifters 1508(1)-1508(4) may be coupled with a radio-frequency (RF) chain 1512. The RF chain 1512 may amplify a receive analog RF signal, downconvert the RF signal to baseband, and convert the analog baseband signal to a digital baseband signal that may be provided to a baseband processor for further processing.

In various embodiments, control circuitry, which may reside in a baseband processor, may provide BF weights (for example, W1-W4), which may represent phase shift values, to the phase shifters 1508(1)-1508(4) to provide a receive beam at the antenna panel 1604. These BF weights may be determined based on the channel-based beamforming.

Figure 16:
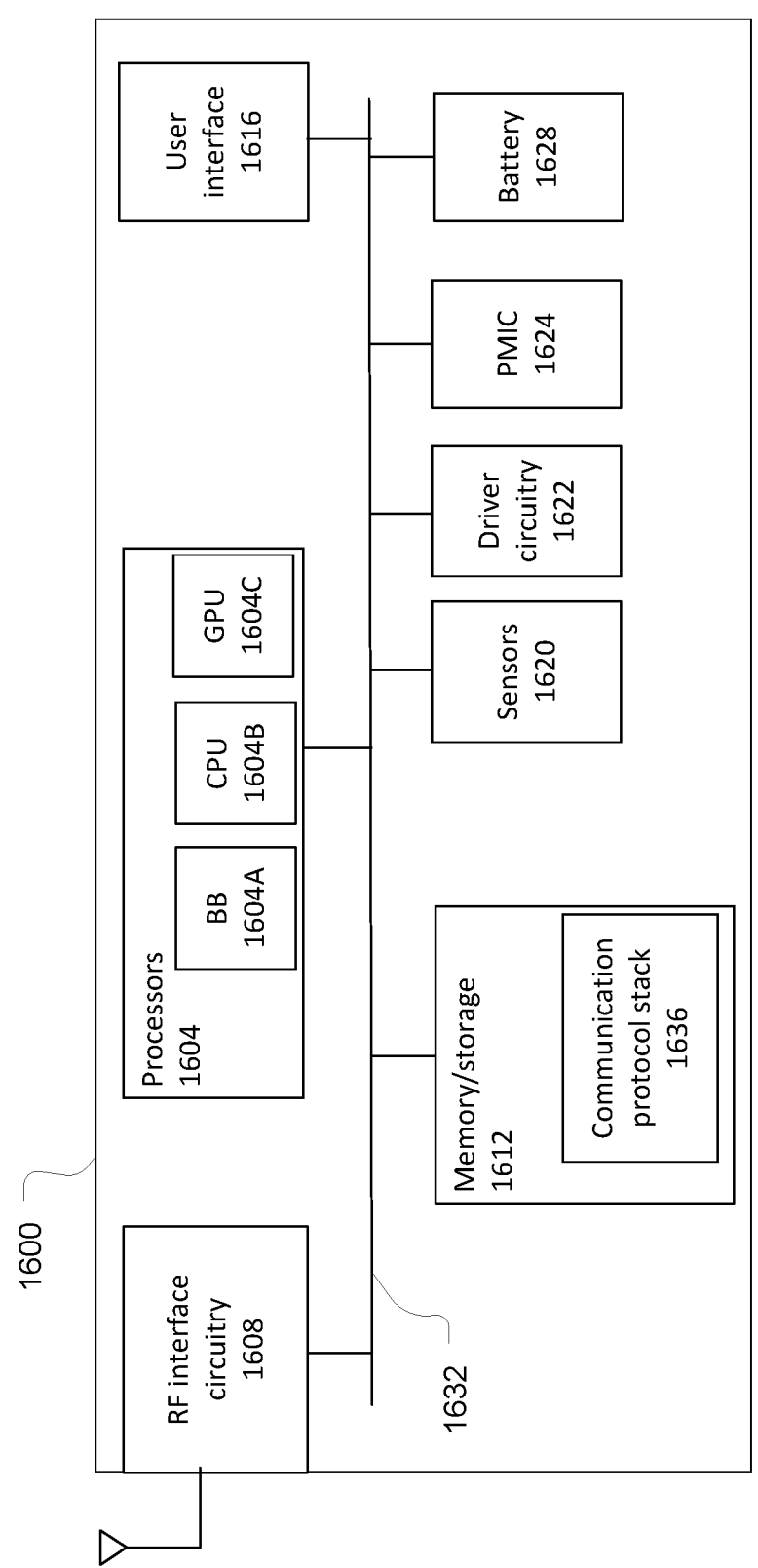
FIG. 16 illustrates an example of a user equipment (UE), in accordance with some embodiments.

FIG. 16 illustrates a UE 1600, in accordance with some embodiments. The UE 1600 may be similar to and substantially interchangeable with UE 106 of FIG. 1.

Similar to that described above with respect to UE 106, the UE 1600 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices, or relaxed-IoT devices. In some embodiments, the UE may be a reduced capacity UE or NR-Light UE.

The UE 1600 may include processors 1604, RF interface circuitry 1608, memory/storage 1612, user interface 1616, sensors 1620, driver circuitry 1622, power management integrated circuit (PMIC) 1624, and battery 1628. The components of the UE 1600 may be implemented as integrated circuits (ICs), portions thereof, discrete electronic devices, or other modules, logic, hardware, software, firmware, or a combination thereof. The block diagram of FIG. 16 is intended to show a high-level view of some of the components of the UE 1600. However, some of the components shown may be omitted, additional components may be present, and different arrangements of the components shown may occur in other implementations.

The components of the UE 1600 may be coupled with various other components over one or more interconnects 1632, which may represent any type of interface, input/ output, bus (local, system, or expansion), transmission line, trace, optical connection, etc. that allows various circuit components (on common or different chips or chipsets) to interact with one another.

The processors 1604 may include processor circuitry, such as, for example, baseband processor circuitry (BB) 1604A, central processor unit circuitry (CPU) 1604B, and graphics processor unit circuitry (GPU) 1604C. The processors 1604 may include any type of circuitry or processor circuitry that executes or otherwise operates computer-executable instructions, such as program code, software modules, or functional processes from memory/storage 1612 to cause the UE 1600 to perform operations as described herein.

In some embodiments, the baseband processor circuitry 1604A may access a communication protocol stack 1636 in the memory/storage 1612 to communicate over a 3GPP compatible network. In general, the baseband processor circuitry 1604A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1608.

The baseband processor circuitry 1604A may generate or process baseband signals or waveforms that carry information in 3GPP-compatible networks. In some embodiments, the waveforms for NR may be based on cyclic prefix OFDM (CP-OFDM) in the uplink or downlink, and discrete Fourier transform spread OFDM (DFT-S-OFDM) in the uplink.

The baseband processor circuitry 1104A may also access group information 1624 from memory/storage 1612 to determine search space groups in which a number of repetitions of a PDCCH may be transmitted.

The memory/storage 1612 may include any type of volatile or non-volatile memory that may be distributed throughout the UE 1600. In some embodiments, some of the memory/storage 1612 may be located on the processors 1604 themselves (for example, L1 and L2 cache), while other memory/storage 1612 is external to the processors 1604 but accessible thereto via a memory interface. The memory/storage 1612 may include any suitable volatile or non-volatile memory such as, but not limited to, dynamic random access memory (DRAM), static random access memory (SRAM), erasable programmable read-only memory (EPROM), electrically erasable programmable read-only memory (EEPROM), Flash memory, solid-state memory, or any other type of memory device technology.

The RF interface circuitry 1608 may include transceiver circuitry and a radio frequency front module (RFEM) that allows the UE 1600 to communicate with other devices over a radio access network. The RF interface circuitry 1608 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 1624 and proceed to filter and amplify (with a low-noise amplifier) the signal. The signal may be provided to a receiver of the transceiver that down-converts the RF signal into a baseband signal that is provided to the baseband processor of the processors 1604.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1624.

In various embodiments, the RF interface circuitry 1608 may be configured to transmit/receive signals in a manner compatible with NR access technologies.

The antenna 1624 may include a number of antenna elements that each convert electrical signals into radio waves to travel through the air and to convert received radio waves into electrical signals. The antenna elements may be arranged into one or more antenna panels. The antenna 1624 may have antenna panels that are omnidirectional, directional, or a combination thereof to enable beamforming and multiple input, multiple output communications. The antenna 1624 may include microstrip antennas, printed antennas fabricated on the surface of one or more printed circuit boards, patch antennas, phased array antennas, etc. The antenna 1624 may have one or more panels designed for specific frequency bands, including bands in FR1 or FR2.

The user interface circuitry 1616 includes various input/output (I/O) devices designed to enable user interaction with the UE 1600. The user interface 1616 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including inter alia, one or more simple visual outputs/indicators (for example, binary status indicators, such as light emitting diodes (LEDs) and multi-character visual outputs, or more complex outputs, such as display devices or touchscreens (for example, liquid crystal displays (LCDs), LED displays, quantum dot displays, projectors, etc.), with the output of characters, graphics, multimedia objects, and the like being generated or produced from the operation of the UE 1600.

The sensors 1620 may include devices, modules, or subsystems whose purpose is to detect events or changes in their environment and transmit the information (sensor data) about the detected events to some other device, module, subsystem, etc. Examples of such sensors include, inter alia, inertia measurement units comprising accelerometers; gyroscopes; or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example; cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1622 may include software and hardware elements that operate to control particular devices that are embedded in the UE 1600, attached to the UE 1600, or otherwise communicatively coupled with the UE 1600. The driver circuitry 1622 may include individual drivers allowing other components to interact with or control various input/output (I/O) devices that may be present within, or connected to, the UE 1600. For example, driver circuitry

1622 may include a display driver to control and allow access to a display device, a touchscreen driver to control and allow access to a touchscreen interface, sensor drivers to obtain sensor readings of sensor circuitry 1620 and control and allow access to sensor circuitry 1620, drivers to obtain actuator positions of electro-mechanic components or control and allow access to the electro-mechanic components, a camera driver to control and allow access to an embedded image capture device, audio drivers to control and allow access to one or more audio devices.

The PMIC 1624 may manage power provided to various components of the UE 1600. In particular, with respect to the processors 1604, the PMIC 1624 may control power-source selection, voltage scaling, battery charging, or DC-to-DC conversion.

In some embodiments, the PMIC 1624 may control, or otherwise be part of, various power saving mechanisms of the UE 1600. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1600 may power down for brief intervals of time and thus save power. If there is no data traffic activity for an extended period of time, then the UE 1600 may transition off to an RRC Idle state, where it disconnects from the network and does not perform operations, such as channel quality feedback, handover, etc. The UE 1600 goes into a very low power state and it performs paging where again it periodically wakes up to listen to the network and then powers down again. The UE 1600 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1628 may power the UE 1600, although in some examples, the UE 1600 may be mounted deployed in a fixed location and may have a power supply coupled to an electrical grid. The battery 1628 may be a lithium ion battery, a metal-air battery, such as a zinc-air battery, an aluminum-air battery, a lithium-air battery, and the like. In some implementations, such as in vehicle-based applications, the battery 11628 may be a typical lead-acid automotive battery.

Figure 17:
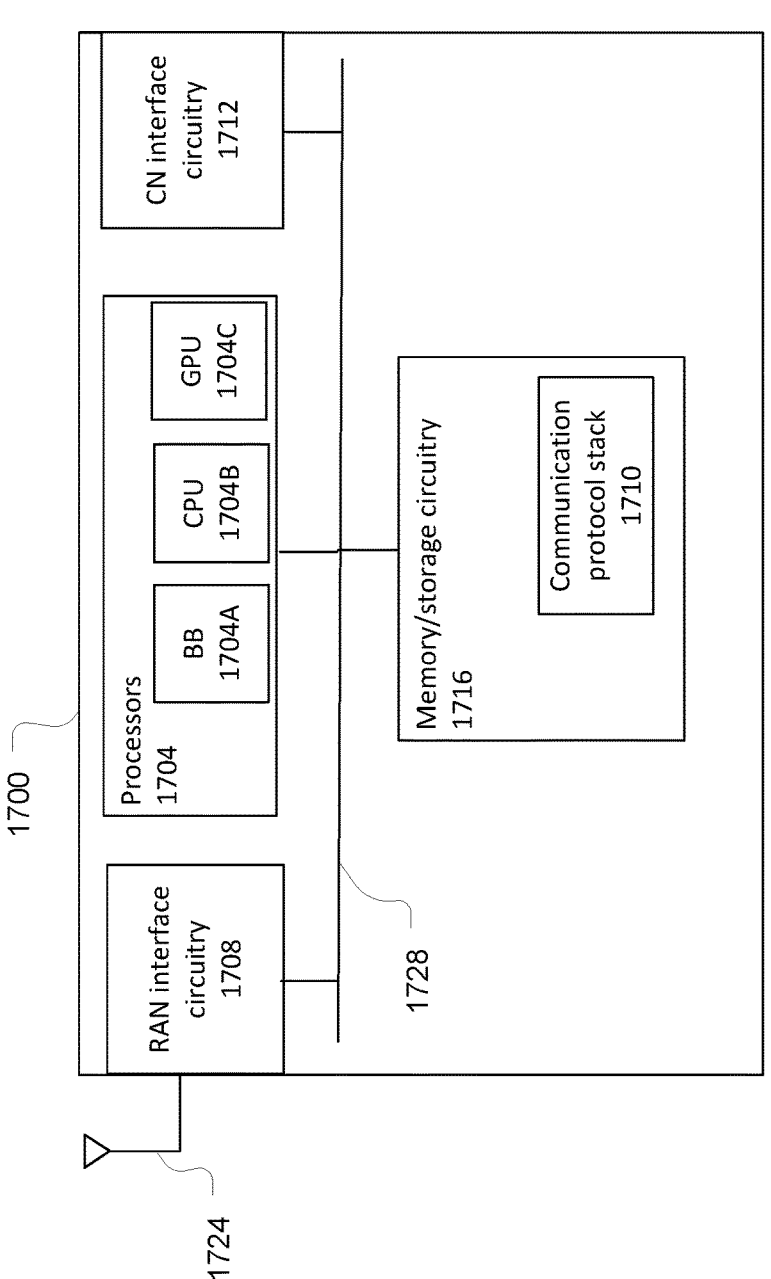
FIG. 17 illustrates an example of a base station, in accordance with some embodiments.

FIG. 17 illustrates a gNB 1700, in accordance with some embodiments. The gNB node 1700 may be similar to and substantially interchangeable with the base station 104 of FIG. 1.

The gNB 1700 may include processors 1704, RF interface circuitry 1708, core network (CN) interface circuitry 1712, and memory/storage circuitry 1716.

The components of the gNB 1700 may be coupled with various other components over one or more interconnects 1728.

The processors 1704, RF interface circuitry 1708, memory/storage circuitry 1716 (including communication protocol stack 1710), antenna 1724, and interconnects 1728 may be similar to like-named elements shown and described with respect to FIG. 15.

The CN interface circuitry 1712 may provide connectivity to a core network, for example, a 5th Generation Core network (5GC) using a 5GC-compatible network interface protocol, such as carrier Ethernet protocols, or some other suitable protocol. Network connectivity may be provided to/from the gNB 1700 via a fiber optic or wireless backhaul. The CN interface circuitry 1712 may include one or more dedicated processors or FPGAs to communicate using one or more of the aforementioned protocols. In some implementations, the CN interface circuitry 1712 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

or one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method implemented by a first network, the method comprising: receiving, via an access and mobility management function (AMF), a first request message including a spectrum inquiry request from a base station to an automated frequency coordinator of the first network, the automated frequency coordinator configured to manage access to a spectrum access tier of a second network; determining, by at least using an AMF interface (Namf) and an automated frequency coordinator interface (Nafc), a spectrum inquiry response of the automated frequency coordinator, the spectrum inquiry response describing an available frequency band of the spectrum access tier of the second network for the base station; and transmitting, to the base station and via the AMF, a first response message including the spectrum inquiry response from the automated frequency coordinator.

Example 2 includes the method of example 1, wherein the method further comprises: performing, via the automated frequency coordinator, a spectrum inquiry to identify available frequency bands of the spectrum access tier based on the spectrum inquiry request; and generating the spectrum inquiry response based on the performed spectrum inquiry, the spectrum inquiry response including the available frequency band of the second network.

Example 3 includes the method of any of examples 1 and 2, wherein the method further comprises: identifying a spectrum access tier of the base station; and responding to the spectrum inquiry request based at least in part on the spectrum inquiry and the spectrum access tier of the base station.

Example 4 includes the method of any of examples 1-3 wherein the AMF transmits the first request message from the base station to the automated frequency coordinator via the Namf; and wherein the automated frequency coordinator receives the first request message via the Nafc.

Example 5 includes the method of any of examples 1-4, wherein the method further comprises: receiving, by the AMF and from the base station, a second request message including a grant request to reserve the available frequency band of the second network; and transmitting, by the AMF and to the automated frequency coordinator, the second request message via the Namf.

Example 6 includes the method of example 5, wherein the method further comprises: receiving, by the automated frequency coordinator and from the base station via the AMF, the second request message via the Nafc; determining, by the automated frequency coordinator, a grant response as to whether to reserve the available frequency band of the second network; and transmitting, by the automated frequency coordinator and to the base station via AMF, a second response message via the Nafc, the second response message including the grant response including the determination of whether to reserve the available frequency band of the second network.

Example 7 includes the method of any of examples 1-6, wherein the method further comprises: receiving, by the AMF and from the base station, a third request message including a heartbeat request for authorization to transmit on the available frequency band of the second network; and transmitting, by the AMF and to the automated frequency coordinator, the third request message via the Namf.

Example 8 includes the method of example 7, wherein the method further comprises: receiving, by the automated frequency coordinator and from the base station via AMF, the third request message via the Nafc; determining, by the automated frequency coordinator, a heartbeat response as to whether to allow the base station to transmit on the available frequency band of the second network; and transmitting, by the automated frequency coordinator and to the base station via the AMF, a third response message via the Nafc, the third response message including the heartbeat response.

Example 9 includes the method of any of examples 1-8, wherein the method further comprises: receiving, by the AMF and from the base station, a fourth request message including a grant relinquishment request to relinquish the available frequency band of the second network; and transmitting, by the AMF and to the automated frequency coordinator, the fourth request message via the Namf.

Example 10 includes the method of example 9, wherein the method further comprises: receiving, by the automated frequency coordinator and from the base station via the AMF, the fourth request message via the Nafc; determining, by the automated frequency coordinator, a grant relinquishment response as to whether to allow the base station to relinquish the available frequency band of the second network; and transmitting, by the automated frequency coordinator and to the base station via the AMF, a fourth response message via the Nafc, the fourth response message including the grant relinquishment response.

Example 11 includes the method of example 9, wherein the first request message includes an automated frequency coordinator transfer container, the automated frequency coordinator transfer container including the spectrum inquiry request.

Example 12 includes the method of any of examples 1-11, wherein the method further comprises: performing, by the automated frequency coordinator, a periodic spectrum inquiry of the spectrum access tier for available frequency bands of the second network; and publishing, by the automated frequency coordinator, the availability of the spectrum to the base station.

Example 13 includes a computer-readable medium having stored thereon a sequence of instructions which, when executed, causes a processor to perform operations including a method described in or related to examples 1-12.

Example 14 includes a system comprising means to perform one or more elements of a method described in or related to example 1-12.

Example 15 includes a first network node of a first network, comprising: a processor; and a computer-readable medium including instructions that, when executed by the processor, cause the processor to: receive, from a base station of the first network and via a first interface to the base station, a spectrum inquiry request; transmit, to a second network node of the first network, a first request message including the spectrum inquiry request via a second interface of the first network node and a third interface of the second network node, the second network node configured to manage access to a spectrum access tier of a second network; receive, from the second network node via the second interface and the third interface, a first response message including the spectrum inquiry response describing an available frequency band of the spectrum access tier of the second network for the base station; and transmit, to the base station and via the first interface, the spectrum inquiry response.

Example 16 includes the first network node of example 15, wherein the instructions further cause the processor to: receive, from the base station, a grant request to reserve the available frequency band of the spectrum access tier via the first interface; and transmit, to the second network node, a second request message including the grant request via the second interface.

Example 17 includes the first network node of any of examples 15 and 16, wherein the instructions further cause the processor to: receive, from the base station and in response to a granted frequency band of the second network, a heartbeat request including an authorization to transmit on the granted frequency band via the first interface; and transmit, to the second network node a third request message including the heartbeat request via the second interface.

Example 18 includes the first network node of any of examples 15-17, wherein the instructions further cause the processor to: receive, from the base station, a grant relinquishment request including a request to relinquish a granted frequency band on the spectrum access tier via the first interface; and transmit, to the second network node, a fourth request message including the grant relinquishment request via the second interface.

Example 19 includes a computer-readable medium having stored thereon a sequence of instructions which, when executed, causes a processor to perform operations including a method described in or related to examples 15-18.

Example 20 includes a method including any of the steps described in or related to examples 15-18.

Example 21, includes a non-transitory computer-readable medium having stored thereon a sequence of instructions which, when executed on a first network node of a first network, causes the first network node to perform operations comprising: receiving, from a second network node of the first network, a first request message including a spectrum inquiry request via a second interface of the second network node and a third interface of the first network node, the first network node configured to manage access to a spectrum access tier of a second network, and the second network node receiving the spectrum inquiry request via a first interface of a base station; determining a spectrum inquiry response based on available spectrum of a spectrum access tier of the second network; and transmitting, to the second network node, a first response message including the spectrum inquiry response describing an available frequency band of a spectrum access tier via the second interface and the third interface.

Example 22 includes the non-transitory computer-readable medium of example 21, wherein the operations further comprise: receiving, from the second network node, a second request message including a grant request to reserve the available frequency band of the spectrum access tier via the third interface; determining a grant response including a determination of whether to reserve the frequency band of the second network; and transmitting, to the second network node, a second response message including the grant response via the third interface.

Example 23 includes the non-transitory computer-readable medium of any of examples 21 and 22, wherein the operations further comprise: receiving, from the second network node, a third request message including a heartbeat request for authorization to transmit on the available frequency band of the spectrum access tier via the third interface; determining a heartbeat response as to whether to authorize transmission on the available frequency band of the second network; and transmitting, to the second network node, a third response message including the heartbeat response via the third interface.

Example 24 includes the non-transitory computer-readable medium of any of examples 21-23, wherein the operations further comprise: receiving, from the second network node, a fourth request message including a grant relinquishment request to relinquish authorization to transmit on the available frequency band of the spectrum access tier via the third interface; determining a grant relinquishment response as to whether to allow relinquishment of authorization to transmit on the available frequency band of the second network; and transmitting, to the second network node, a fourth response message including the grant relinquishment response via the third interface.

Example 25 includes a system comprising means to perform one or more elements of a method described in or related to example 21-24.

Example 26 includes a method including any of the steps described in or related to examples 21-24.

Any of the above-described examples may be combined with any other example (or combination of examples), unless explicitly stated otherwise. The foregoing description of one or more implementations provides illustration and description but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
receiving, from a base station over an NG interface between an access and mobility management function (AMF) and the base station, a first request message from the base station to an automated frequency coordinator of a first network, the first request message including a spectrum inquiry request, the automated frequency coordinator and AMF being part of the first network, and the automated frequency coordinator configured to manage access to a spectrum access tier of a second network;
outputting, for transmission, a spectrum inquiry to the automated frequency coordinator over an AMF interface (Namf), wherein the automated frequency coordinator is to receive the spectrum inquiry request over an automated frequency coordinator interface (Nafc);
receiving, over the Namf and the Nafc, a spectrum inquiry response of the automated frequency coordinator, the spectrum inquiry response describing an available frequency band of the spectrum access tier of the second network for the base station; and
outputting, for transmission to the base station over the NG interface, a first response message including the spectrum inquiry response from the automated frequency coordinator.

2. The method of claim 1, wherein the method further comprises:
performing, through the automated frequency coordinator, the spectrum inquiry based on the spectrum inquiry request, the performed spectrum inquiry to identify available frequency bands of the spectrum access tier based on the spectrum inquiry request; and
receiving the spectrum inquiry response based on the performed spectrum inquiry.

3. The method of claim 1, wherein the spectrum inquiry response is based on a spectrum access tier of the base station.

4. The method of claim 1, wherein the automated frequency coordinator is a core network function in a core network of the first network.

5. The method of claim 1, wherein the method further comprises:
receiving, by the AMF from the base station, a second request message including a grant request to reserve the available frequency band of the second network; and
transmitting, by the AMF to the automated frequency coordinator, the second request message over the Namf and the Nafc.

6. The method of claim 5, wherein the method further comprises:
receiving, by the AMF from the automated frequency coordinator over the Nafc, a grant response including a determination of whether the available frequency band of the second network has been reserved; and
transmitting, by the AMF to the base station, a second response message including the grant response.

7. The method of claim 1, wherein the method further comprises:
receiving, from the base station, a third request message over the NG interface, the third request message including a heartbeat request for authorization to transmit on the available frequency band of the second network; and
outputting, for transmission to the automated frequency coordinator, the third request message over the Namf, wherein the automated frequency coordinator is to receive the third request message over the Nafc.

8. The method of claim 7, wherein the method further comprises:
receiving, from the automated frequency coordinator over the Namf a heartbeat response indicating whether the base station is allowed to transmit on the available frequency band of the second network, wherein the automated frequency coordinator is to send the heartbeat response over the Nafc; and outputting, for transmission to the base station over the NG interface, a third response message including the heartbeat response.

9. The method of claim 1, wherein the method further comprises:

receiving, from the base station over the NG interface, a fourth request message including a grant relinquishment request to relinquish the available frequency band of the second network; and outputting, for transmission to the automated frequency coordinator, the fourth request message over the Namf, wherein the automated frequency coordinator is to receive the fourth request message over the Nafc.

10. The method of claim 9, wherein the method further comprises:

receiving, from the automated frequency coordinator over the Namf, a grant relinquishment response indicating whether the base station is allowed to relinquish the available frequency band of the second network, wherein the automated frequency coordinator is to send the grant relinquishment response over the Nafc; and outputting, for transmission to the base station over the NG interface, a fourth response message including the grant relinquishment response.

11. The method of claim 9, wherein the first request message includes an automated frequency coordinator transfer container, the automated frequency coordinator transfer container including the spectrum inquiry request.

12. A method comprising:

receiving, from an access and mobility management function (AMF) of a first network, a spectrum inquiry request via a over a spectrum access system (SAS) interface (Nsas) and an AMF interface (Namf), wherein the spectrum inquiry request is based on a first request received by the AMF from a base station over an NG interface;

determining, based on the spectrum inquiry request, available spectrum of a spectrum access tier of a second network;

determining, based on the determined available spectrum, a spectrum inquiry response describing an available frequency band of the spectrum access tier of the second network; and outputting, for transmission to the AMF over the Nsas and the Namf, the spectrum inquiry response for delivery to the base station.

13. An apparatus comprising:

interface circuitry; and processor circuitry, coupled with the interface circuitry, the processor circuitry to:

receive, using the interface circuitry, a first request message from a base station of a first network over an NG interface between the base station and an access and mobility management function (AMF) of the first network;

output, for transmission using the interface circuitry to a spectrum access system (SAS) of the first network, a spectrum inquiry request over an AMF interface (Namf), wherein the SAS is to receive the spectrum inquiry request over an SAS interface (Nsas) of the SAS, and the SAS is configured to manage access to a spectrum access tier of a second network;

receive, from the SAS using the interface circuitry, a spectrum inquiry response over the Namf and the Nsas, the spectrum inquiry response describing an available frequency band of the spectrum access tier of the second network for the base station; and output, for transmission over the NG interface to the base station using the interface circuitry, a first response message including the spectrum inquiry response.

14. The apparatus of claim 13, wherein the processor circuitry is further to:

receive, from the base station over the NG interface, a grant request to reserve the available frequency band of the spectrum access tier; and output, for transmission to the SAS over the Namf, a second request message including the grant request.

15. The apparatus of claim 13, wherein the processor circuitry is further to:

receive, from the base station and in response to a granted frequency band of the second network, a heartbeat request including an authorization to transmit on the granted frequency band over the NG interface; and output, for transmission to the SAS a third request message including the heartbeat request over the Namf.

16. The apparatus of claim 13, wherein the processor circuitry is further to:

receive, from the base station, a grant relinquishment request including a request to relinquish a granted frequency band on the spectrum access tier over the NG interface; and transmit, to the SAS, a fourth request message including the grant relinquishment request over the Namf.

17. The method of claim 12, wherein the method further comprises:

performing a periodic spectrum inquiry of the spectrum access tier for available frequency bands of the second network; and publishing the availability of the available spectrum to the base station.

18. The method of claim 12, further comprising:

receiving, from the AMF, a second request message including a grant request to reserve the available frequency band of the spectrum access tier over the Nsas;

determining a grant response including a determination of whether to reserve the frequency band of the second network; and transmitting, to the AMF, a second response message including the grant response over the Nsas.

19. The method of claim 17, further comprising:

receiving, from the AMF, a third request message including a heartbeat request for authorization to transmit on the available frequency band of the spectrum access tier over the Nsas;

determining a heartbeat response as to whether to authorize transmission on the available frequency band of the second network; and transmitting, to the AMF, a third response message including the heartbeat response over the Nsas.

20. The method of claim 12, further comprising:

receiving, from the AMF, a fourth request message including a grant relinquishment request to relinquish authorization to transmit on the available frequency band of the spectrum access tier over the Nsas;

determining a grant relinquishment response as to whether to allow relinquishment of authorization to transmit on the available frequency band of the second network; and transmitting, to the AMF, a fourth response message including the grant relinquishment response over the Nsas.

\* \* \* \* \*